United States Patent
Hrusch et al.

(10) Patent No.: US 10,626,930 B2
(45) Date of Patent: Apr. 21, 2020

(54) ELECTROMAGNETIC SELECTABLE WEDGE CLUTCH

(71) Applicant: Schaeffler Technologies AG & Co. KG, Herzogenaurach (DE)

(72) Inventors: Nicholas Hrusch, Wooster, OH (US); Md Wasi Uddin, Akron, OH (US); Kevin Rauh, Stow, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 91 days.

(21) Appl. No.: 16/121,787

(22) Filed: Sep. 5, 2018

(65) Prior Publication Data

US 2020/0072300 A1 Mar. 5, 2020

(51) Int. Cl.
*F16D 13/18* (2006.01)
*F16D 41/063* (2006.01)
*F16D 27/102* (2006.01)
*F16D 13/06* (2006.01)
*F16D 41/06* (2006.01)
*F16D 15/00* (2006.01)

(52) U.S. Cl.
CPC .......... *F16D 27/102* (2013.01); *F16D 13/06* (2013.01); *F16D 13/18* (2013.01); *F16D 41/063* (2013.01); *F16D 15/00* (2013.01); F16D 2041/0606 (2013.01)

(58) Field of Classification Search
CPC ....... F16D 13/18; F16D 41/063; F16D 27/102
See application file for complete search history.

(56) References Cited

U.S. PATENT DOCUMENTS

| | | | | |
|---|---|---|---|---|
| 9,482,297 | B2* | 11/2016 | Brubaker | F16D 41/125 |
| 9,933,023 | B2* | 4/2018 | Hemphill | F16D 41/063 |
| 2014/0014454 | A1* | 1/2014 | Davis | F16D 41/063 |
| | | | | 192/45.1 |
| 2014/0014455 | A1* | 1/2014 | Davis | F16D 15/00 |
| | | | | 192/45.1 |
| 2015/0323018 | A1* | 11/2015 | Hemphill | F16D 41/063 |
| | | | | 192/40 |
| 2016/0290417 | A1* | 10/2016 | Brubaker | F16D 41/16 |
| 2019/0277351 | A1* | 9/2019 | Hrusch | F16D 27/118 |

* cited by examiner

*Primary Examiner* — David R Morris

(57) ABSTRACT

A wedge clutch, including: outer and inner races; a wedge plate radially between the inner and outer races; and an electromagnetic actuator. The electromagnetic actuator includes: a coil; a first coil core piece including a first end disposed within the coil and a second end connected to the wedge plate; and a second coil core piece including a first end disposed within the first coil and a second end connected to the wedge plate. In a locked mode of the clutch, the inner race and outer races and the wedge plate are non-rotatably connected for rotation of the inner race in a circumferential direction. In a free-wheel mode of the clutch, the inner race is rotatable, with respect to the outer race, in the circumferential direction. To transition from the locked mode to the free-wheel mode, the electromagnetic actuator is arranged to be energized to radially contract the wedge plate.

20 Claims, 21 Drawing Sheets

ELECTROMAGNETIC SELECTABLE WEDGE CLUTCH

TECHNICAL FIELD

The present disclosure relates to an electromagnetic selectable wedge clutch includes at least one electromagnetic actuator, connected to at least one wedge plate, to switch the wedge clutch among various modes of operation.

BACKGROUND

It is known to use electro-actuation to manipulate wedge plates for a wedge plate clutch. However, the known methods of using electro-actuation result in residual magnetism in the wedge plates, which hampers operation of the wedge plate clutch.

SUMMARY

According to aspects illustrated herein, there is provided a wedge clutch, including: an axis of rotation; an outer race; an inner race; a wedge plate radially disposed between the inner race and the outer race; and an electromagnetic actuator. The electromagnetic actuator includes: a coil; a first coil core piece including a first end disposed within the coil and a second end connected to the wedge plate; and a second coil core piece including a first end disposed within the first coil and a second end connected to the wedge plate. In a locked mode of the wedge clutch, the inner race, the wedge plate, and the outer race are non-rotatably connected for rotation of the inner race in a circumferential direction. In a free-wheel mode of the wedge clutch, the inner race is rotatable, with respect to the outer race, in the circumferential direction. To transition from the locked mode to the free-wheel mode, the electromagnetic actuator is arranged to be energized to radially contract the wedge plate.

According to aspects illustrated herein, there is provided a wedge clutch, including: an outer race; an inner race; a wedge plate; and an electromagnetic actuator. The wedge plate: is radially disposed between the first inner race and the outer race; includes a first circumferential end; and a second circumferential end; and is discontinuous between the first circumferential end and the second circumferential end. The electromagnetic actuator includes: a coil; a first coil core piece including a first end disposed within the coil; and a second end fixedly connected to the first circumferential end of the wedge plate; and a second coil core piece including a first end disposed within the coil; and a second end fixedly connected to the second circumferential end the wedge plate. In a locked mode of the wedge clutch, the inner race, the wedge plate, and the outer race are non-rotatably connected for rotation of the inner race in a circumferential direction. In a free-wheel mode of the wedge clutch, the inner race is rotatable, with respect to the outer race, in the circumferential direction. To transition from the locked mode to the free-wheel mode, the electromagnetic actuator is arranged to be energized to: displace the first end of the first coil core piece and the first end of the second coil core piece toward each other; and radially contract the wedge plate.

According to aspects illustrated herein, there is provided a wedge clutch, including: an axis of rotation; an outer race; an inner race; a wedge plate radially disposed between the inner race and the outer race; and an electromagnetic actuator. The electromagnetic actuator includes: a coil; a first coil core piece including a first end disposed within the first coil and a second end fixedly connected to the wedge plate; and a second coil core piece including a third end disposed within the first coil and a fourth end fixedly connected to the wedge plate. In a locked mode of the wedge clutch, the inner race, the wedge plate, and the outer race are non-rotatably connected. In a free-wheel mode of the wedge clutch, the inner race is rotatable with respect to the outer race. To transition from the locked mode to the free-wheel mode, the electromagnetic actuator is arranged to be energized to radially contract the wedge plate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 24:
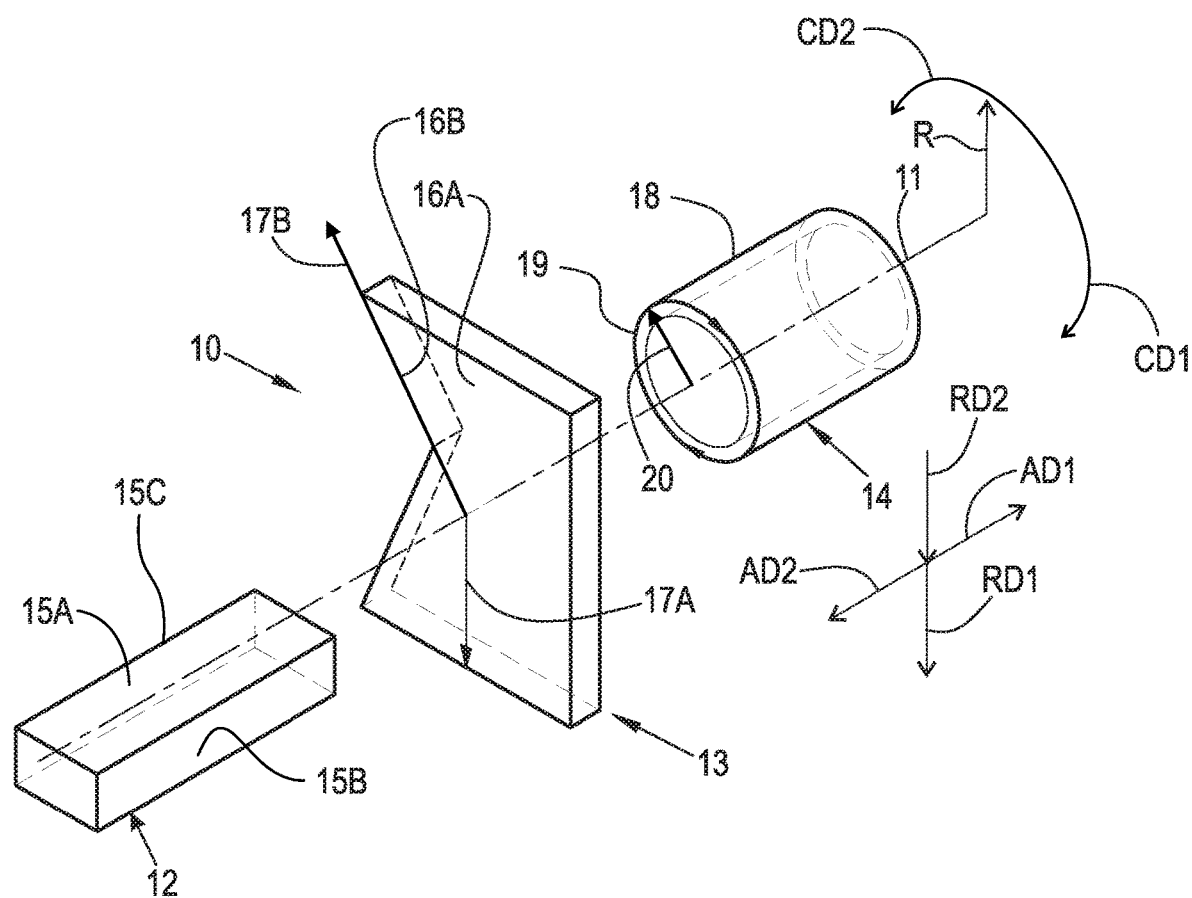
FIG. 24 is a perspective view of a cylindrical coordinate system demonstrating spatial terminology used in the present application.

FIG. 24 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 158, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
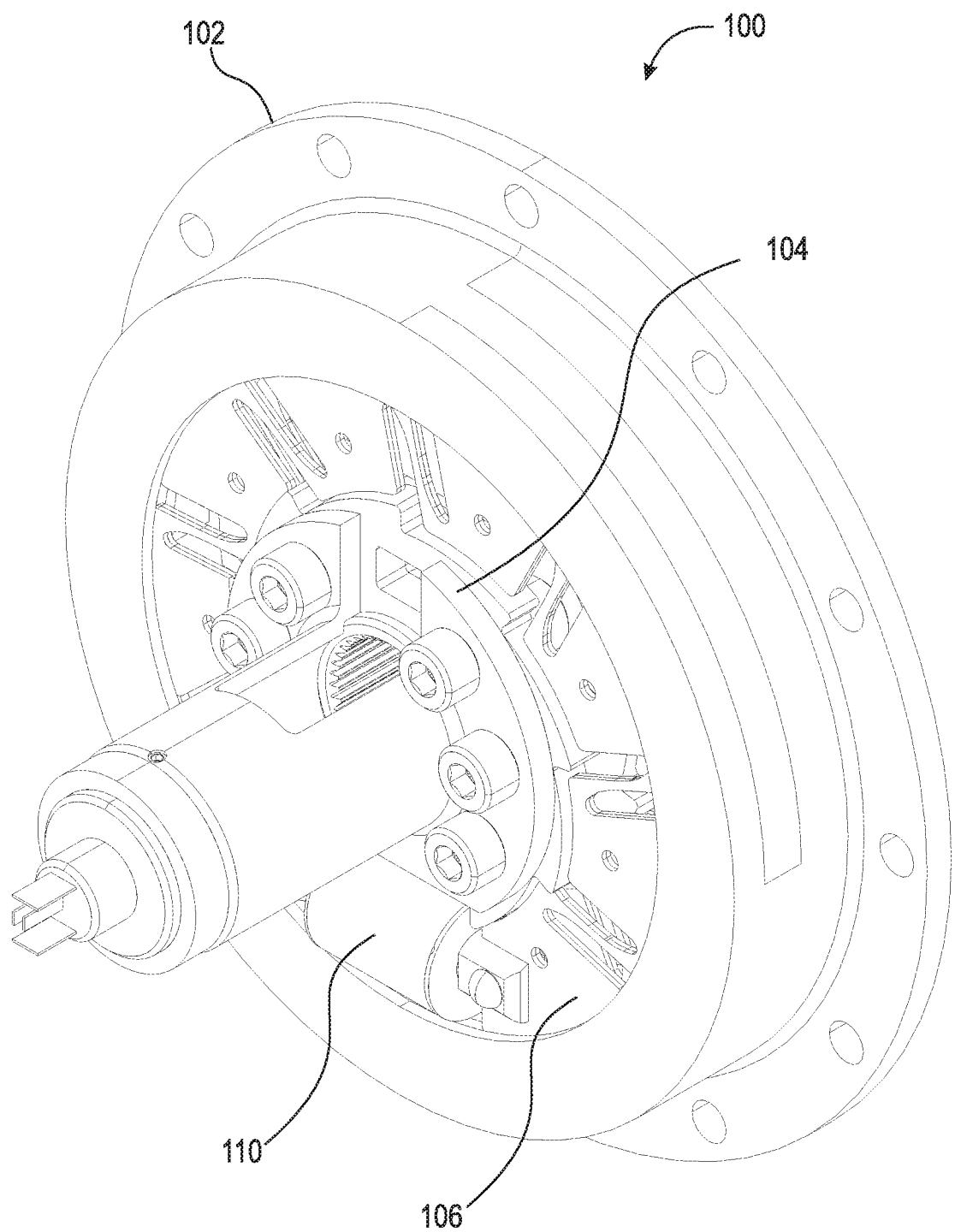
FIG. 1 is a front perspective view of an electromagnetic selectable wedge clutch.

FIG. 1 is a front perspective view of electromagnetic selectable wedge clutch 100.

Figure 2:
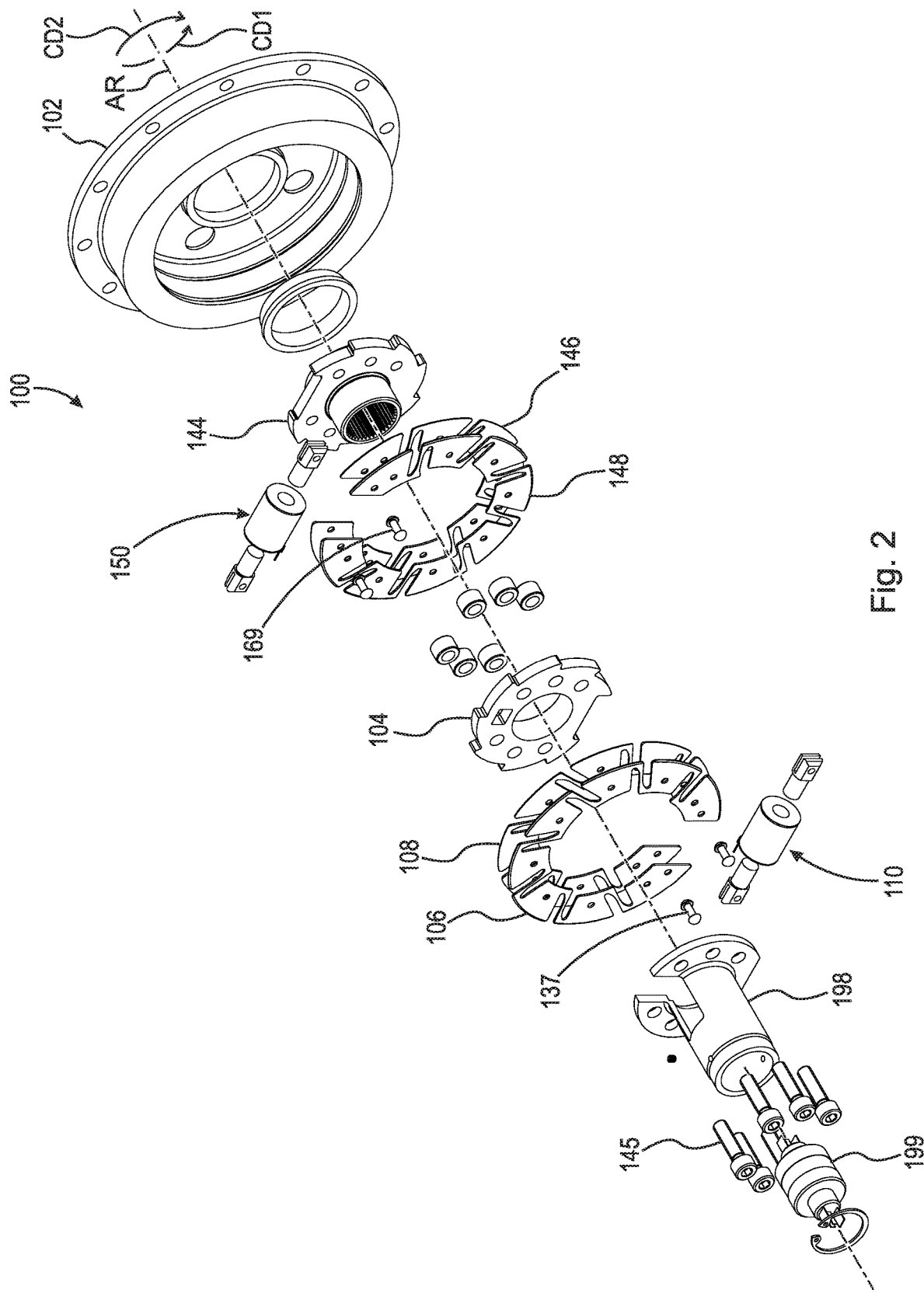
FIG. 2 is an exploded view of the electromagnetic selectable wedge clutch of FIG. 1.

FIG. 2 is an exploded view of electromagnetic selectable wedge clutch 100 of FIG. 1.

Figure 3:
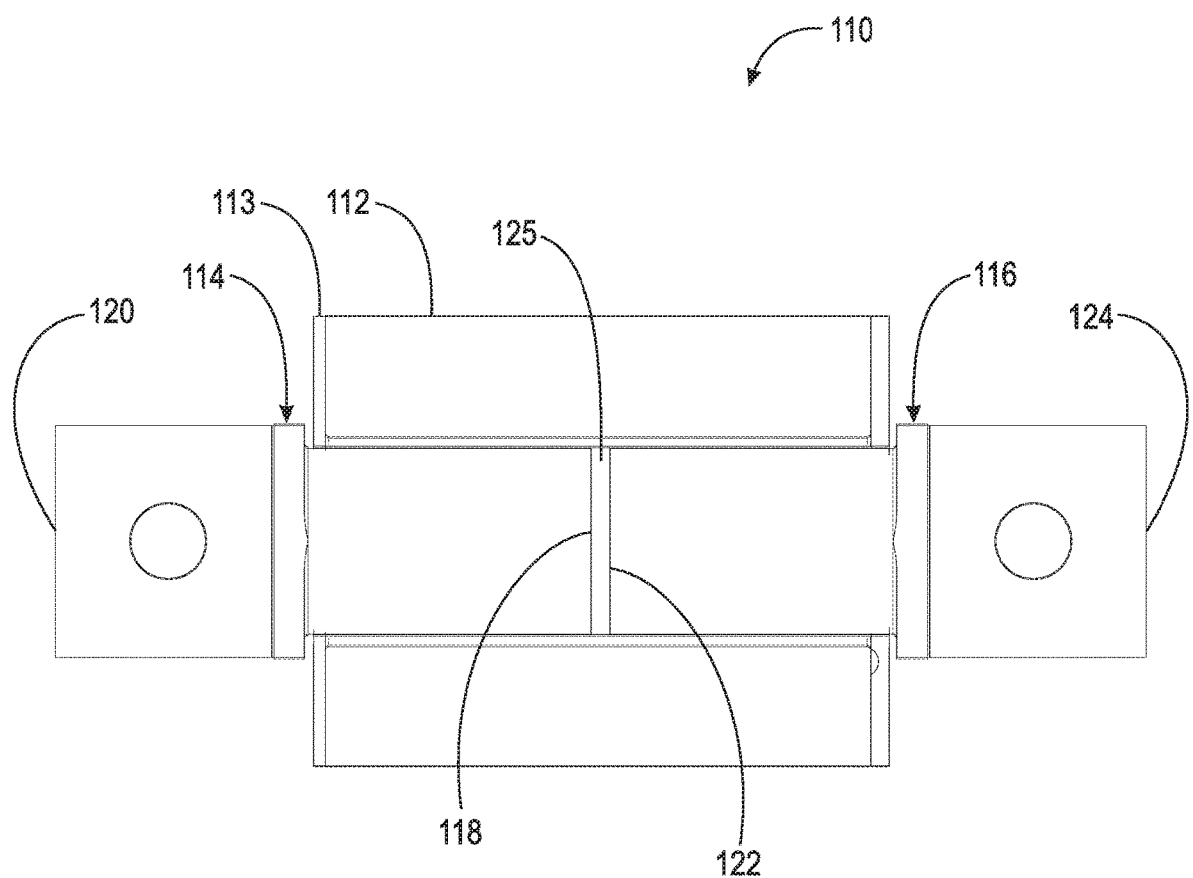
FIG. 3 is a cross-sectional view of an electromagnetic actuator of the electromagnetic selectable wedge clutch of FIG. 1.

FIG. 3 is a cross-sectional view of an electromagnetic actuator of electromagnetic selectable wedge clutch 100 of FIG. 1. The following should be viewed in light of FIGS. 1 through 3. Wedge clutch 100 includes: axis of rotation AR; outer race 102; inner race 104; wedge plates 106 and 108; and electromagnetic actuator 110. Wedge plates 106 and 108 are radially disposed between inner race 104 and outer race 102. In an example embodiment, wedge plates 106 and 108 includes slots SL1 extending radially inwardly from radially outer circumference ROC and slots SL2 extending radially outwardly from radially inner circumference RIC. In the example of FIG. 1, electromagnetic actuator 110 includes coil 112; bobbin 113; coil core piece 114; and coil core piece 116. Coil core piece 114 includes: end 118 disposed within coil 112; and end 120 connected to wedge plates 106 and 108. Coil core piece 116 includes: end 122 disposed within coil 112; and end 124 connected to wedge plates 106 and 108. To accommodate the radial contraction of wedge plates 106 and 108 described below, ends 118 and 122 are separated by air gap 125.

In the example of FIG. 1, inner race 104 is arranged to receive rotational torque. In a first locked mode of wedge clutch 100, inner race 104, wedge plates 106 and 108, and outer race 102 are non-rotatably connected for rotation of inner race 104 in circumferential direction CD1. In a first free-wheel mode of wedge clutch 100, inner race 104 is rotatable, with respect to the outer race 102, in circumferential direction CD1. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

To transition from the first locked mode to the first free-wheel mode, electromagnetic actuator 110 is arranged to be energized to: draw ends 118 and 122 toward each other; and radially contract wedge plates 106 and 108. To transition from the first free-wheel mode to the first locked mode: electromagnetic actuator 110 is arranged to be de-energized; and wedge plates 106 and 108 are arranged to expand radially outwardly to initiate or increase frictional contact between wedge plates 106 and 108 and outer race 102. For example, wedge plates 106 and 108 are preloaded with a radially outwardly expanding force that is overcome by electromagnetic actuator 110 to transition to the first free-wheel mode, and which results in the radial expansion characterizing the transition to the first locked mode.

Figure 4:
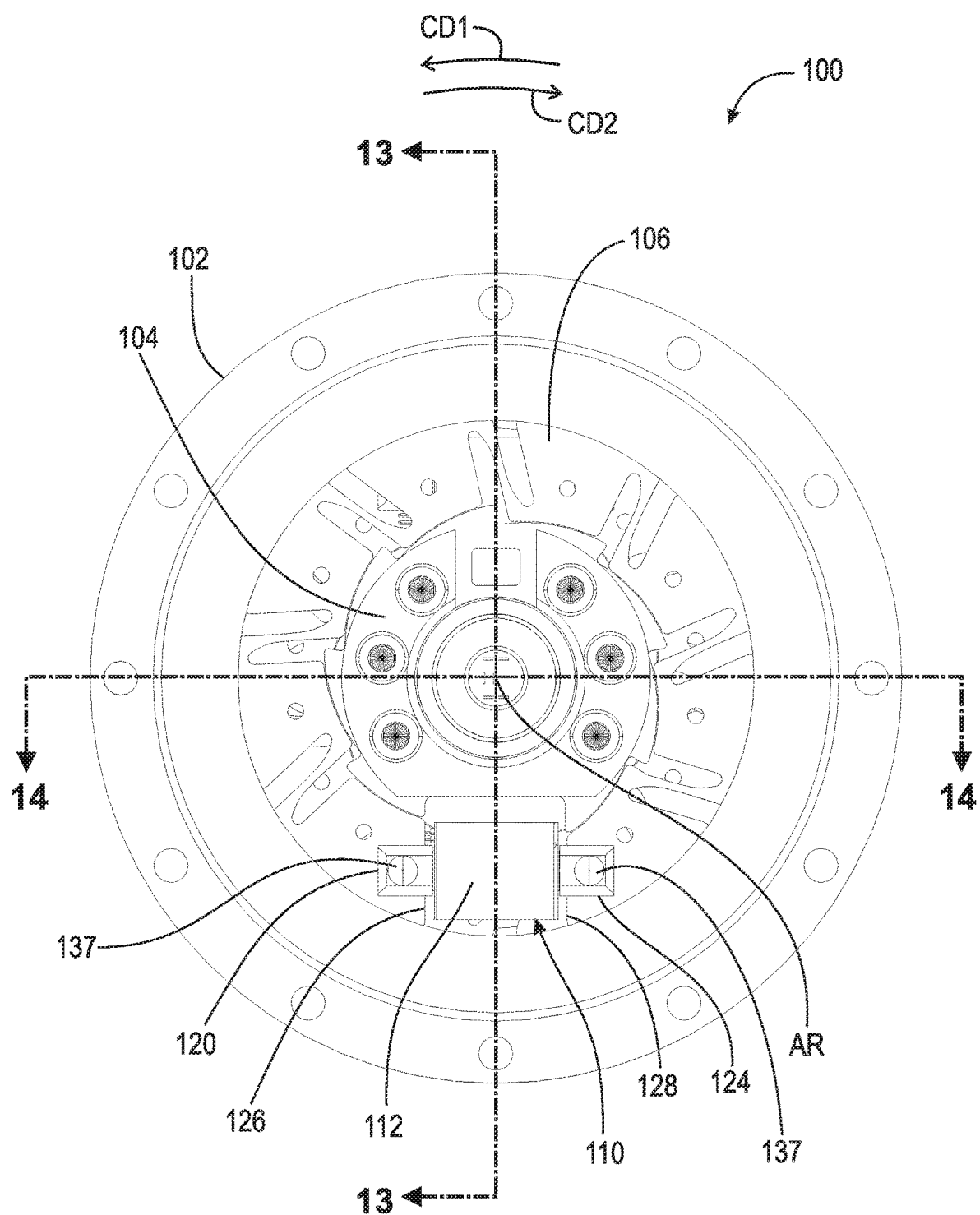
FIG. 4 is a front view of the electromagnetic selectable wedge clutch of FIG. 1.

FIG. 4 is a front view of electromagnetic selectable wedge clutch 100 of FIG. 1.

Figure 5:
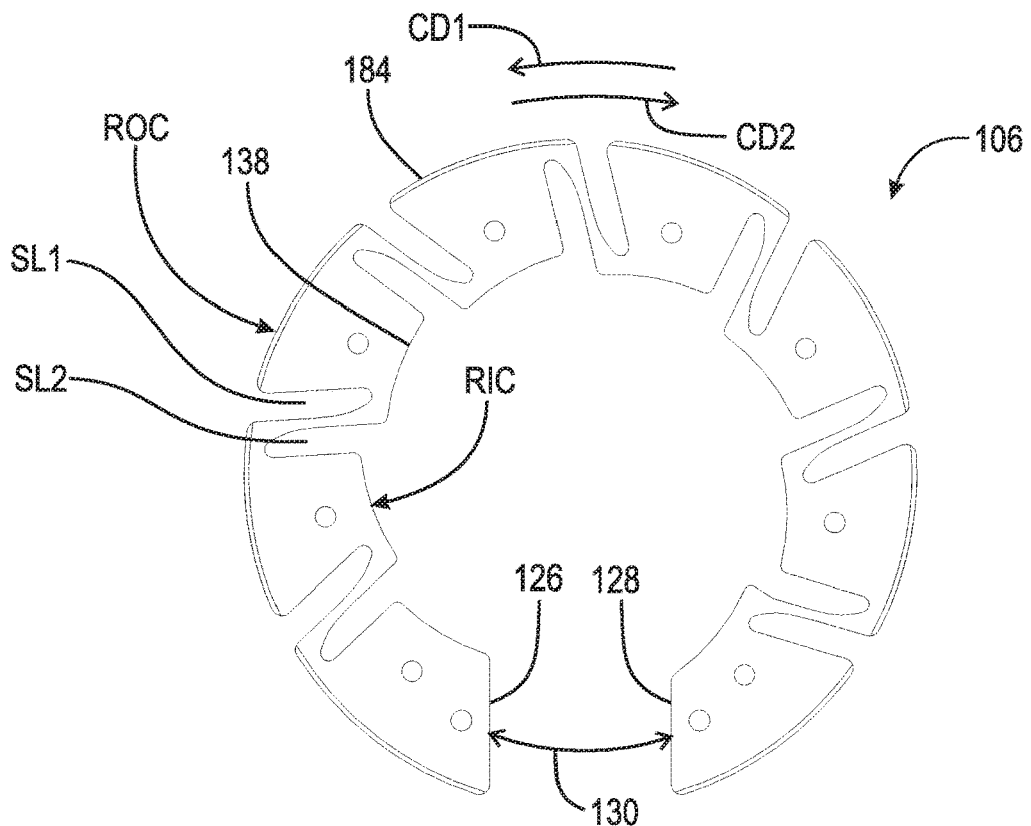
FIG. 5 is a front view of a wedge plate of the electromagnetic selectable wedge clutch of FIG. 1.

FIG. 5 is a front view of wedge plate 106 of electromagnetic selectable wedge clutch 100 of FIG. 1. The following should be viewed in light of FIGS. 1 through 5. Wedge plate 106 includes: circumferential end 126; and circumferential end 128. Wedge plate 106 is discontinuous between end 126 and end 128. For example, ends 126 and 128 are separated by gap 130 in circumferential direction CD1. End 120 of coil core piece 114 is fixedly connected to circumferential end 126. End 124 of coil core piece 116 is fixedly connected to circumferential end 128.

Figure 6:
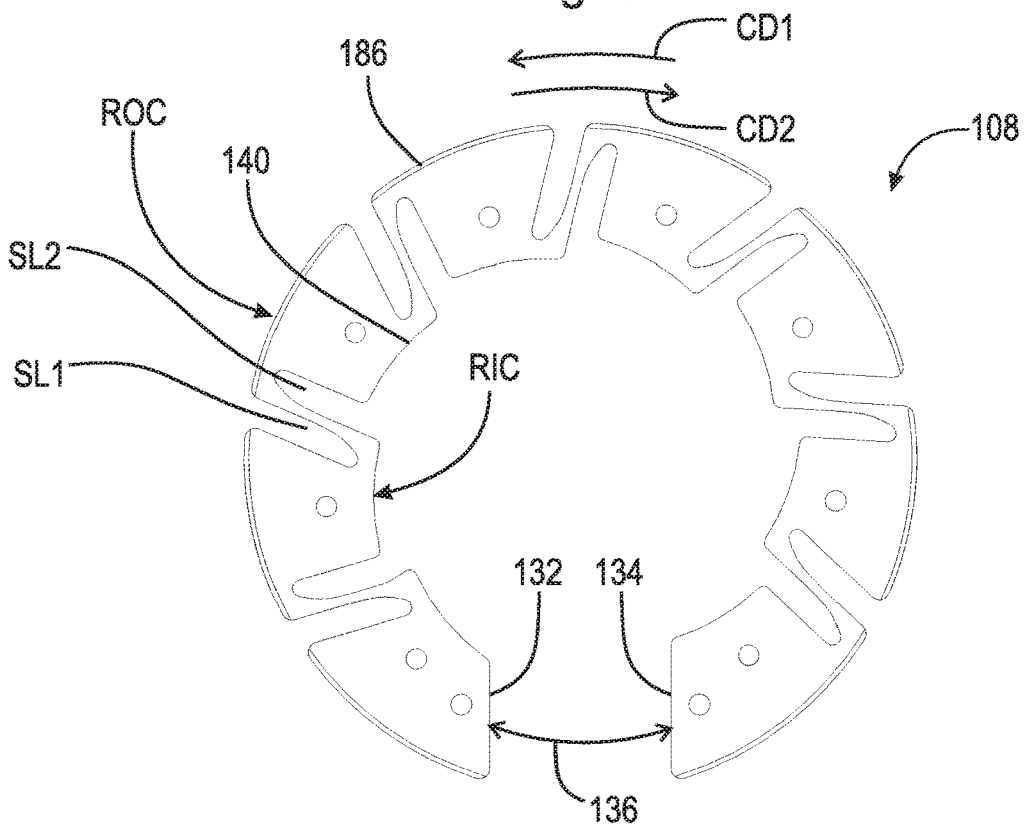
FIG. 6 is a front view of a wedge plate of the electromagnetic selectable wedge clutch of FIG. 1.

FIG. 6 is a front view of wedge plate 108 of electromagnetic selectable wedge clutch 100 of FIG. 1. The following should be viewed in light of FIGS. 1 through 6. Wedge plate 108 includes: circumferential end 132; and circumferential end 134. Wedge plate 108 is discontinuous between end 132 and end 134. For example, ends 132 and 134 are separated by gap 136 in circumferential direction CD1. End 120 of coil core piece 114 is fixedly connected to circumferential end 132. End 124 of coil core piece 116 is fixedly connected to circumferential end 134. In an example embodiment, end 120 of coil core piece 114 is fixedly connected to circumferential ends 126 and 132 with bolt 137 and end 124 of coil core piece 116 is fixedly connected to circumferential ends 128 and 134 with bolt 137. However, it should be understood that any means known in the art can be used to fixedly connect coil core pieces 114 and 116 to wedge plates 106 and 108.

To transition from the first locked mode to the first free-wheel mode, electromagnetic actuator 110 is arranged to be energized to: bring circumferential end 126 and circumferential end 128 toward each in circumferential direction CD1 or circumferential direction CD2, opposite circumferential direction CD1; and bring circumferential end 132 and circumferential end 134 toward each in circumferential direction CD1 or circumferential direction CD2. Stated otherwise, electromagnetic actuator 110 is arranged to be energized to decrease gaps 130 and 136.

Figure 7:
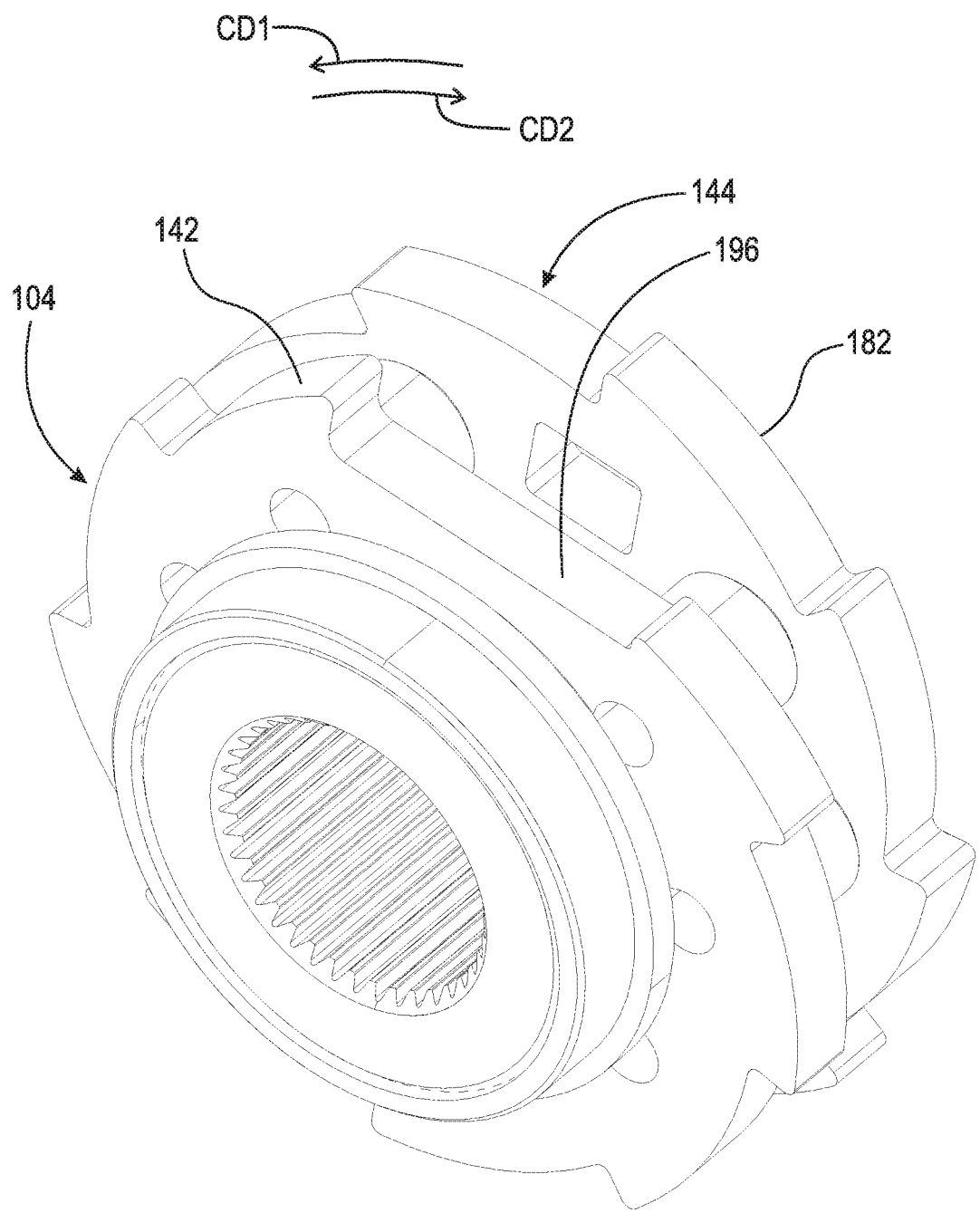
FIG. 7 is a front view of inner races of the electromagnetic selectable wedge clutch of FIG. 1.

FIG. 7 is a front view of inner races of the electromagnetic selectable wedge clutch of FIG. 1. The following should be viewed in light of FIGS. 1 through 7. Wedge plate 106 includes ramps 138. Wedge plate 108 includes ramps 140. Inner race 104 includes ramps 142. Each ramp 138 is in contact with a respective ramp 142. Each ramp 140 is in contact with a respective ramp 142. Each ramp 138, each ramp 140, and each ramp 142 slope radially inwardly in circumferential direction CD1. To transition from the first locked mode to the first free-wheel mode, electromagnetic actuator 110 is arranged to: slide at least one ramp 138 radially inwardly along at least one ramp 142; and slide at least one ramp 140 radially inwardly along at least one ramp 142.

Figure 8:
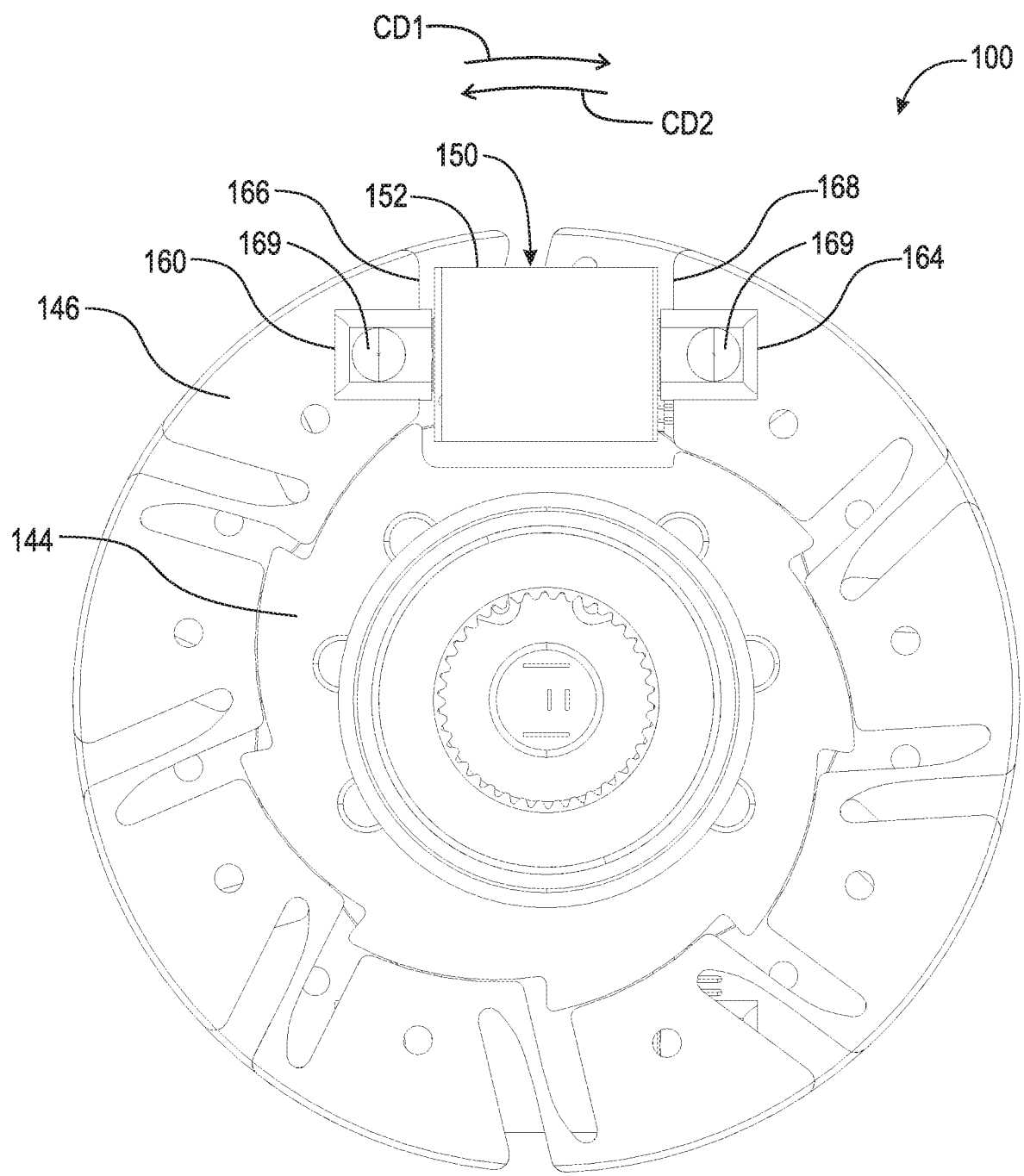
FIG. 8 is a back view of the electromagnetic selectable wedge clutch of FIG. 1 with a portion of an outer race cut-away to show a wedge plate and an inner race.

FIG. 8 is a back view of electromagnetic selectable wedge clutch 100 of FIG. 1 with a portion of outer race 102 cut-away to show a wedge plate and inner race.

Figure 9:
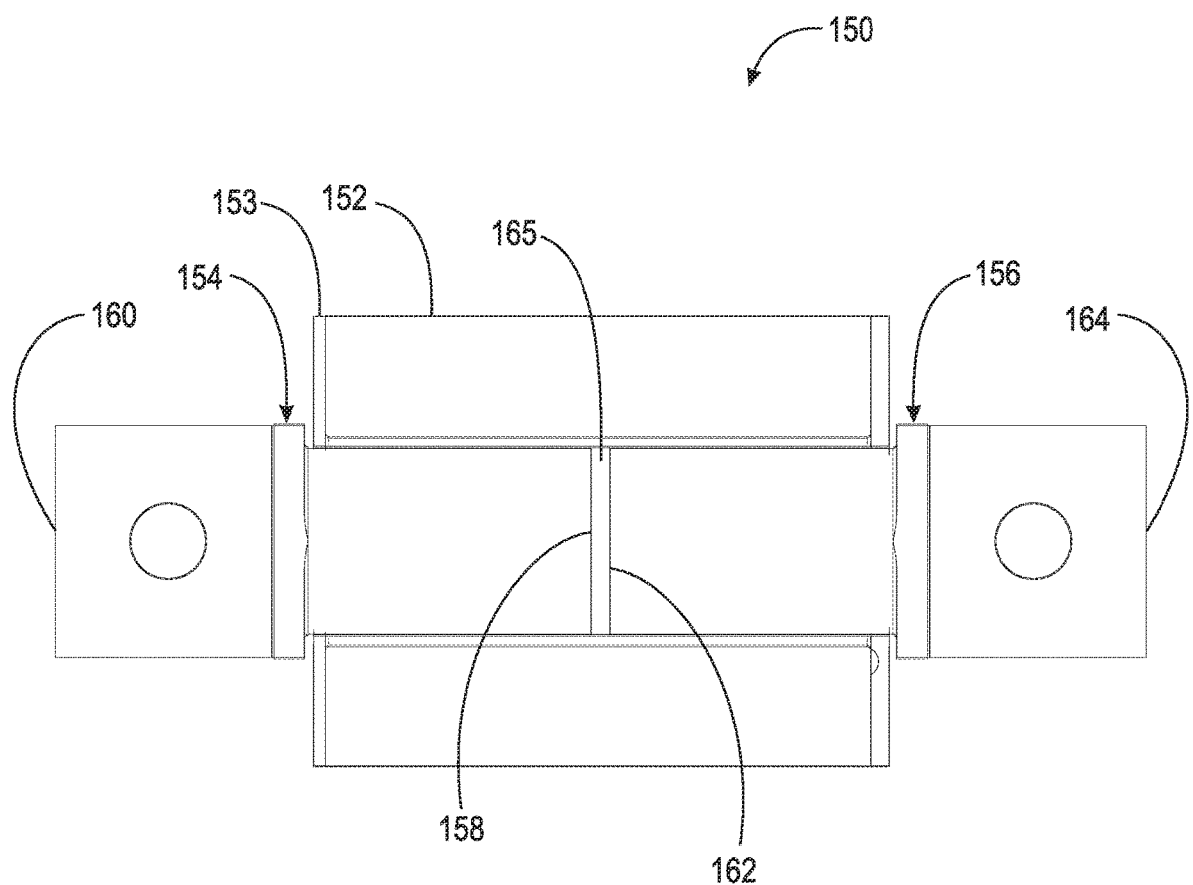
FIG. 9 is a cross-sectional view of an electromagnetic actuator of the electromagnetic selectable wedge clutch of FIG. 1.

FIG. 9 is a cross-sectional view of an electromagnetic actuator of the electromagnetic selectable wedge clutch of FIG. 1. The following should be viewed in light of FIGS. 1 through 9. In an example embodiment, wedge clutch 100 includes: inner race 144 non-rotatably connected to inner race 104 with bolts 145; wedge plates 146 and 148; and electromagnetic actuator 150. Any means known in the art can be used to non-rotatably connect inner races 104 and 144. In an example embodiment (not shown), inner races 104 and 144 are a single monolithic structure. Wedge plates 146 and 148 are radially disposed between inner race 144 and outer race 102.

Figure 10:
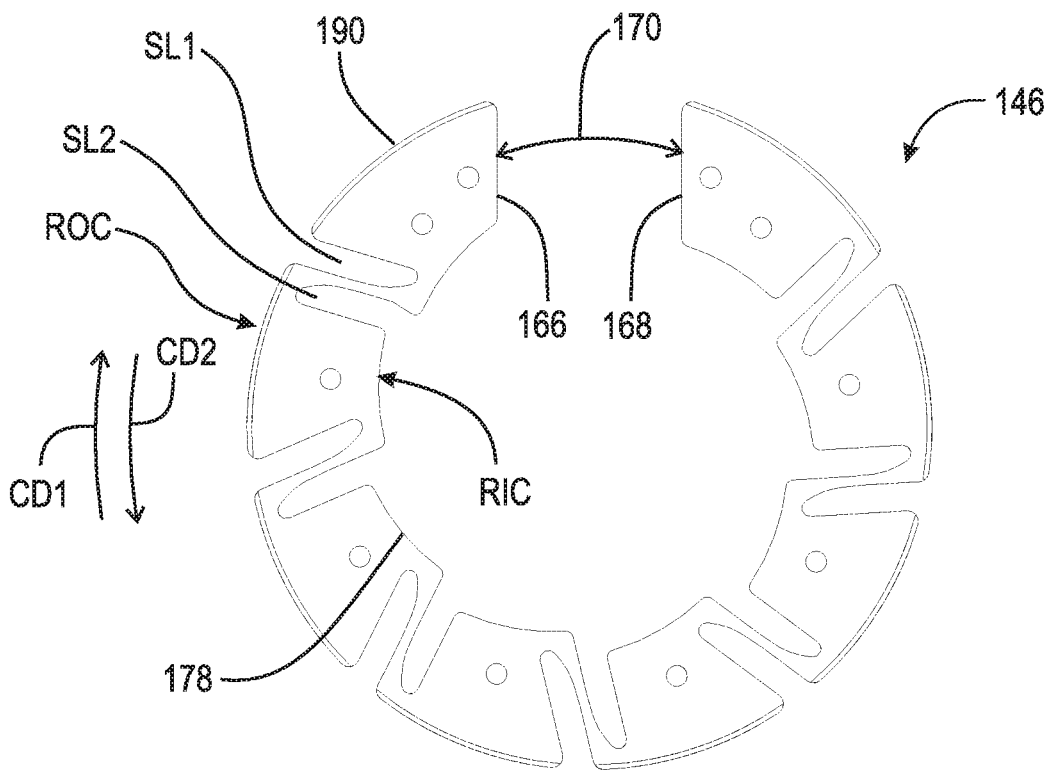
FIG. 10 is a back view of a wedge plate of the electromagnetic selectable wedge clutch of FIG. 1.

FIG. 10 is a back view of a wedge plate of electromagnetic selectable wedge clutch 100 of FIG. 1.

Figure 11:
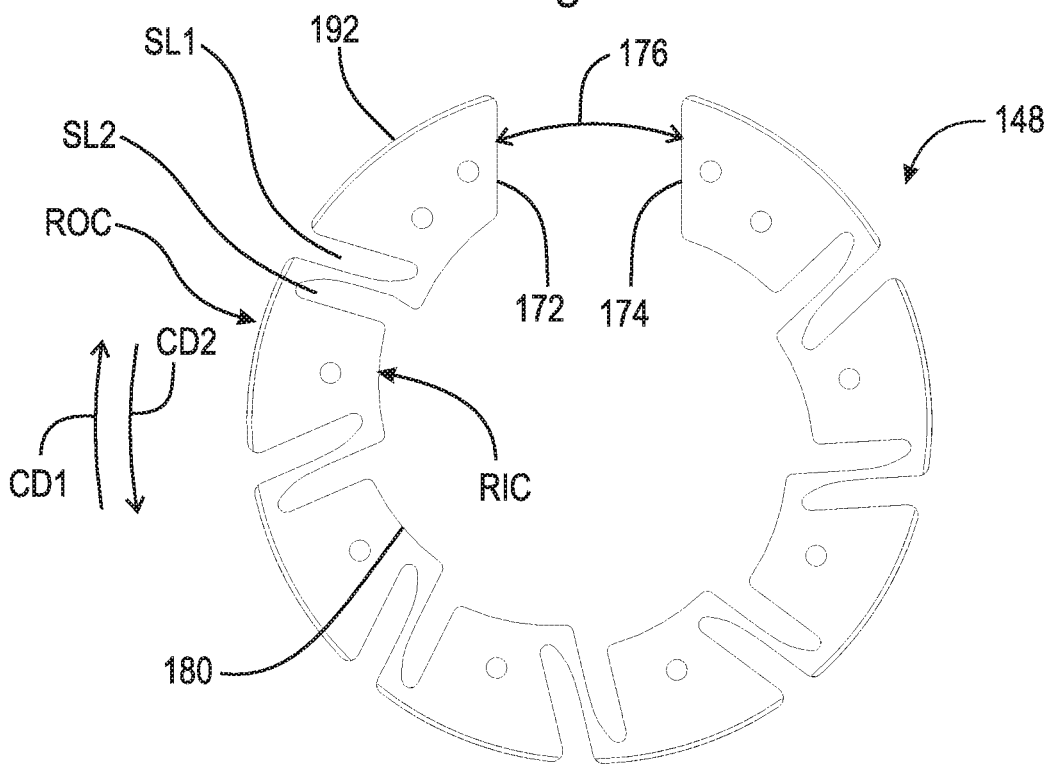
FIG. 11 is a back view of a wedge plate of the electromagnetic selectable wedge clutch of FIG. 1.

FIG. 11 is a back view of a wedge plate of electromagnetic selectable wedge clutch 100 of FIG. 1. The following should be viewed in light of FIGS. 1 through 10. In an example embodiment, wedge plates 146 and 148 includes slots SL1 extending radially inwardly from radially outer circumference ROC and slots SL2 extending radially outwardly from radially inner circumference RIC. In the example of FIG. 1, electromagnetic actuator 150 includes: coil 152; bobbin 153; coil core piece 154; and coil core piece 156. Coil core piece 154 includes: end 158 disposed within coil 152; and end 160 connected to wedge plates 146 and 148. Coil core piece 156 includes: end 162 disposed within coil 152; and end 164 connected to wedge plates 146 and 148. To accommodate the radial contraction of wedge plates 146 and 148 described below, ends 158 and 162 are separated by air gap 165.

In a second locked mode of wedge clutch 100, inner race 144, wedge plates 146 and 148, and outer race 102 are non-rotatably connected for rotation of inner race 144 in circumferential direction CD2. In a second free-wheel mode of wedge clutch 100, inner race 144 is rotatable, with respect to outer race 102, in circumferential direction CD2.

To transition from the second locked mode to the second free-wheel mode, electromagnetic actuator 150 is arranged to be energized to: draw ends 158 and 162 toward each other; and radially contract wedge plates 146 and 148. To transition from the second free-wheel mode to the second locked mode: electromagnetic actuator 150 is arranged to be de-energized; and wedge plates 146 and 148 are arranged to expand radially outwardly to initiate or increase frictional contact between wedge plates 146 and 148 and outer race 102. For example, wedge plates 146 and 148 are preloaded with a radially outwardly expanding force that is overcome by electromagnetic actuator 150 to transition to the second free-wheel mode, and which results in the radial expansion characterizing the transition to the second locked mode.

Wedge plate 146 includes: circumferential end 166; and circumferential end 168. Wedge plate 146 is discontinuous between end 166 and end 168. For example, ends 166 and 168 are separated by gap 170 in circumferential direction CD1. End 160 of coil core piece 154 is fixedly connected to circumferential end 166. End 164 of coil core piece 156 is fixedly connected to circumferential end 168. In an example embodiment, end 160 of coil core piece 154 is fixedly connected to circumferential end 166 with bolt 169 and end 164 of coil core piece 156 is fixedly connected to circumferential end 168 with bolt 169. However, it should be understood that any means known in the art can be used to fixedly connect end 160 of coil core piece 154 to circumferential end 166 and to fixedly connect end 164 of coil core piece 156 to circumferential end 168.

Wedge plate 148 includes: circumferential end 172; and circumferential end 174. Wedge plate 148 is discontinuous between end 172 and end 174. For example, ends 172 and 174 are separated by gap 176 in circumferential direction CD1. End 160 of coil core piece 154 is fixedly connected to circumferential end 172. End 164 of coil core piece 156 is fixedly connected to circumferential end 174. In an example embodiment, end 160 of coil core piece 154 is fixedly connected to circumferential end 172 with bolt 169 and end 164 of coil core piece 156 is fixedly connected to circumferential end 174 with bolt 169. However, it should be understood that any means known in the art can be used to fixedly connect end 160 of coil core piece 154 to circumferential end 172 and to fixedly connect end 164 of coil core piece 156 to circumferential end 174.

To transition from the second locked mode to the second free-wheel mode, electromagnetic actuator 150 is arranged to be energized to: bring circumferential end 166 and circumferential end 168 toward each in circumferential direction CD1 or circumferential direction CD2; and bring circumferential end 172 and circumferential end 174 toward each in circumferential direction CD1 or circumferential direction CD2. Stated otherwise, electromagnetic actuator 150 is arranged to be energized to decrease gaps 170 and 176.

Figure 12:
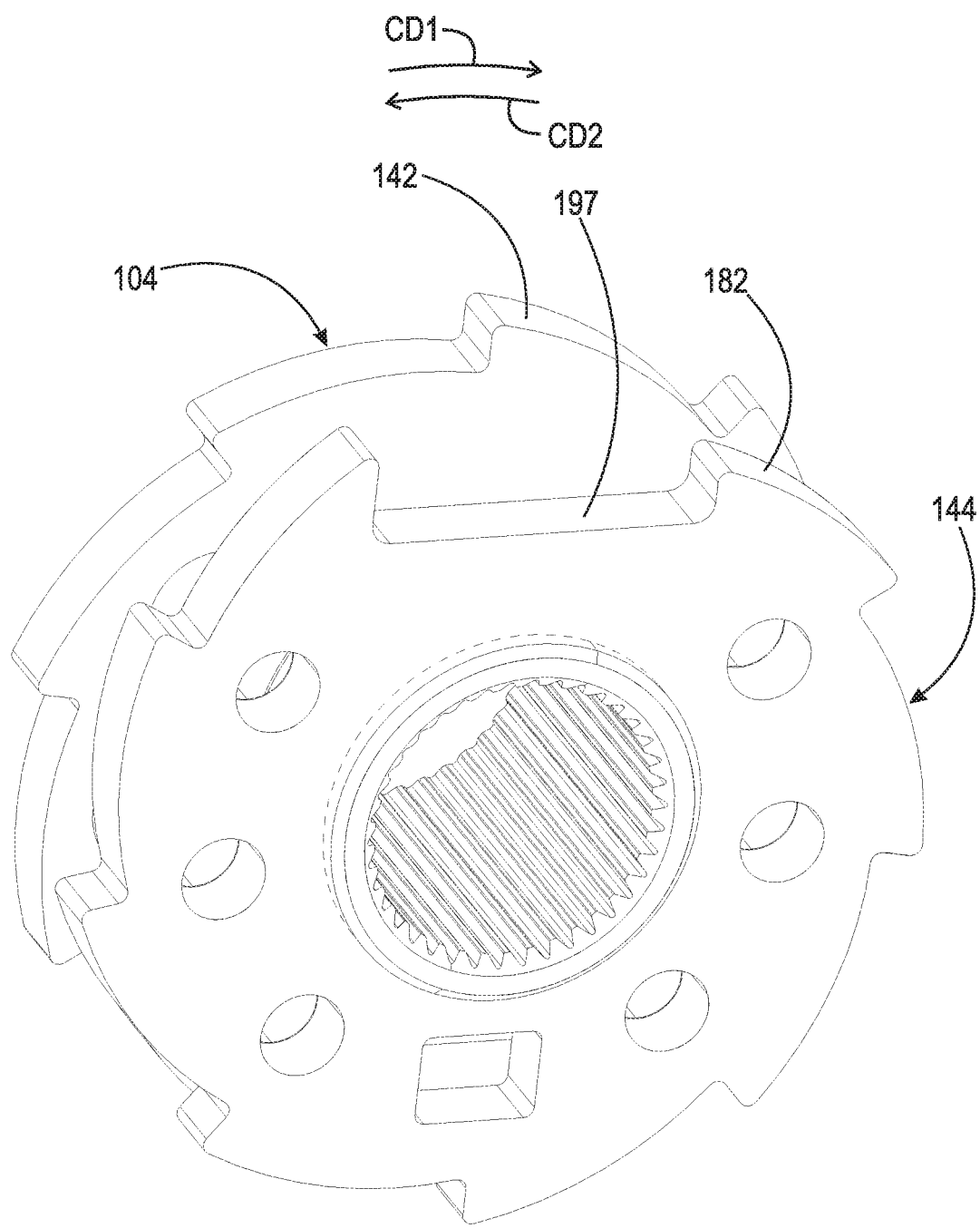
FIG. 12 is a back view of inner aces of the electromagnetic selectable wedge clutch of FIG. 1.

FIG. 12 is a back view of inner races of electromagnetic selectable wedge clutch 100 of FIG. 1. The following should be viewed in light of FIGS. 1 through 12. Wedge plate 146 includes ramps 178, wedge plate 148 includes ramps 180, and inner race 144 includes ramps 182. Each ramp 178 is in contact with a respective ramp 182. Each ramp 180 is in contact with a respective ramp 182. Each ramp 178, each ramp 180, and each ramp 182, slope radially inwardly in circumferential direction CD2. To transition from the second locked mode to the second free-wheel mode, electromagnetic actuator 150 is arranged to: slide at least one ramp 178 radially inwardly along at least one ramp 182; and slide at least one ramp 180 radially inwardly along at least one ramp 182.

Figure 13:
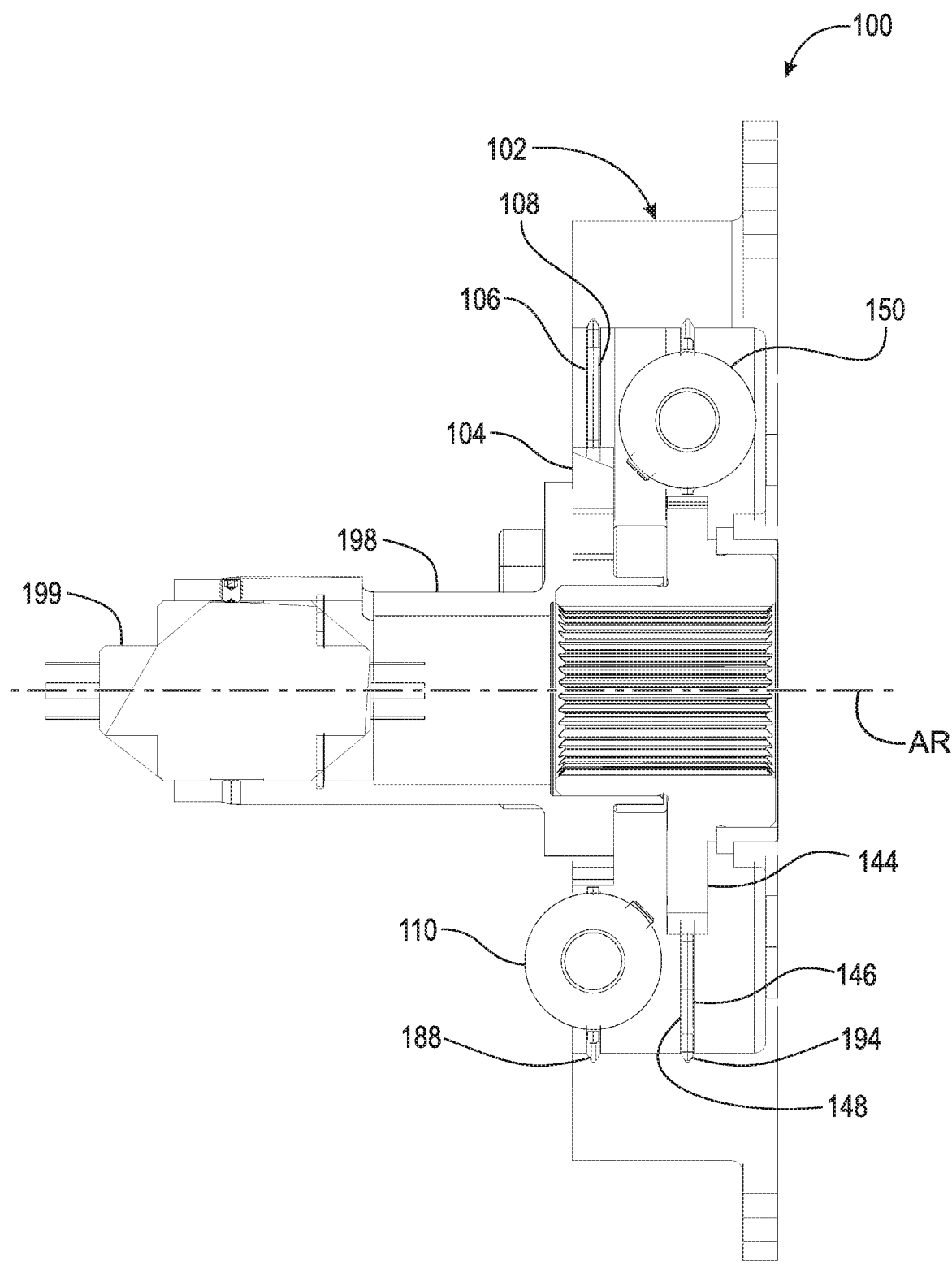
FIG. 13 is a cross-sectional view generally along line 13-13 in FIG. 4.

FIG. 13 is a cross-sectional view generally along line 13-13 in FIG. 4.

Figure 14:
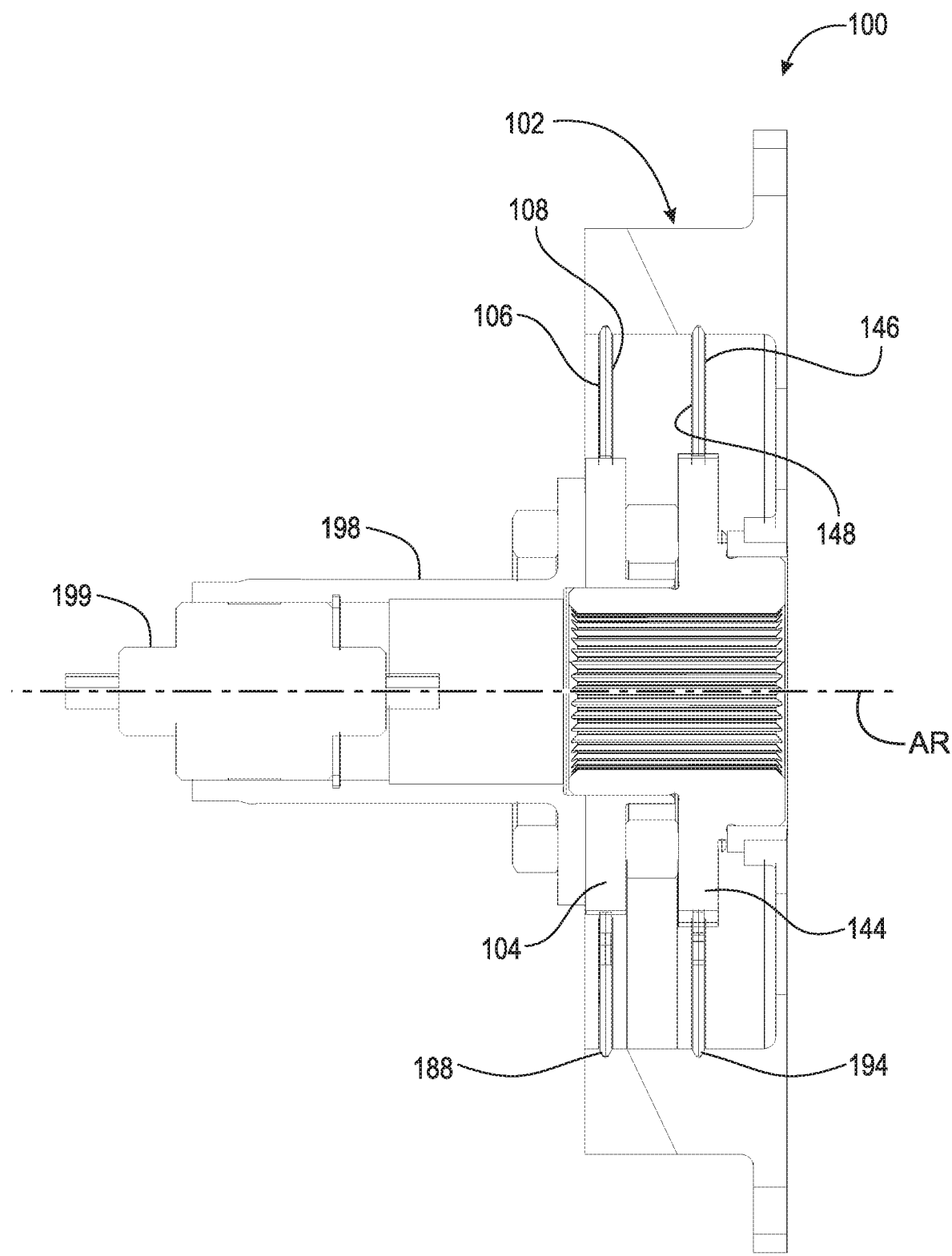
FIG. 14 is a cross-sectional view generally along line 14-14 in FIG. 4.

FIG. 14 is a cross-sectional view generally along line 14-14 in FIG. 4. The following should be viewed in light of FIGS. 1 through 14. In an example embodiment: wedge plate 106 includes chamfer 184; wedge plate 108 includes chamfer 186; and inner race 104 includes groove 188. Chamfers 184 and 186 are disposed at least partly in groove 188. In an example embodiment: wedge plate 146 includes chamfer 190; wedge plate 148 includes chamfer 192; and inner race 144 includes groove 194. Chamfers 190 and 192 are disposed at least partly in groove 194. In an example embodiment: inner race 104 includes slot 196, in which actuator 110 is located; and inner race 144 includes slot 197, in which actuator 150 is located. Electrical power is supplied to actuators 110 and 150 by any means known in the art. In an example embodiment, clutch 100 includes slip ring retainer 198 and slip ring 199 for supplying electrical power to actuators 110 and 150.

The following provides further detail regarding operation of clutch 100. Clutch 100 is a controllable, multi-functional clutch. In the example of FIG. 1, clutch 100 has four operating modes: an open mode; a closed mode; a one-way mode in direction CD1; and a one-way mode in direction CD2. For the open mode, clutch 100 is in the first free-wheel mode and in the second free-wheel mode. For the first free-wheel mode, actuator 110 is energized to radially contract wedge plates 106 and 108 to: non-rotatably connect inner race 104 and wedge plates 106 and 108; and enable inner race 104 and wedge plates 106 and 108 to rotate with respect to outer race 102 in directions CD1 and CD2. For the second free-wheel mode, actuator 150 is energized to radially contract wedge plates 146 and 148 to: non-rotatably connect inner race 144 and wedge plates 146 and 148; and enable inner race 144 and wedge plates 146 and 148 to rotate with respect to outer race 102 in directions CD1 and CD2.

For the closed mode, clutch 100 is in the first locked mode and in the second locked mode. For the first locked mode, actuator 110 is de-energized and wedge plates 106 and 108 expand radially outwardly to increase or initiate frictional contact between wedge plates 106 and 108 and outer race 102. Rotation of inner race 104 in direction CD1 in combination with the frictional contact causes ramps 142 to slide radially inwardly along ramps 138 and 140 to displace wedge plate 106 and 108 radially outwardly to non-rotatably connect inner race 104, wedge plates 106 and 108, and outer race 102. For the second locked mode, actuator 150 is de-energized and wedge plates 146 and 148 expand radially outwardly to increase or initiate frictional contact between wedge plates 146 and 148 and outer race 102. Rotation of inner race 144 in direction CD2 in combination with the frictional contact causes ramps 182 to slide radially inwardly along ramps 178 and 180 to displace wedge plates 146 and 148 radially outwardly to non-rotatably connect inner race 144, wedge plates 146 and 148, and outer race 102. Thus, clutch 100 is closed regardless of the direction of torque applied to clutch 100.

For the one-way mode in circumferential direction CD1, clutch 100 is in the first locked mode and in the second free-wheel mode. For the first locked mode, actuator 110 is de-energized and wedge plates 106 and 108 expand radially outwardly to increase or initiate frictional contact between wedge plates 106 and 108 and outer race 102. Rotation of inner race 104 in direction CD1 in combination with the frictional contact causes ramps 142 to slide radially inwardly along ramps 138 and 140 to non-rotatably connect inner race 104, wedge plates 106 and 108, and outer race 102. Rotation of inner race 104 in direction CD2 slides ramps 142 radially outwardly along ramps 138 and 140, enabling rotation of inner race 104 and wedge plates 106 and 108, with respect to outer race 102, in direction CD2. For the second free-wheel mode, actuator 150 is energized to radially contract wedge plates 146 and 148 to: non-rotatably connect inner race 144 and wedge plates 146 and 148; and enable inner race 144 and wedge plates 146 and 148 to rotate with respect to outer race 102 in directions CD1 and CD2.

For the one-way mode in circumferential direction CD2, clutch 100 is in the second locked mode and in the first free-wheel mode. For the second locked mode, actuator 150 is de-energized and wedge plates 146 and 148 expand radially outwardly to increase or initiate frictional contact between wedge plates 146 and 148 and outer race 102. Rotation of inner race 144 in direction CD2 in combination with the frictional contact causes ramps 182 to slide radially inwardly along ramps 178 and 180 to non-rotatably connect inner race 144, wedge plates 146 and 148, and outer race 102. Rotation of inner race 144 in direction CD1 slides ramps 142 radially outwardly along ramps 178 and 180, enabling rotation of inner race 144 and wedge plates 146 and 148, with respect to outer race 102, in direction CD1. For the first free-wheel mode, actuator 110 is energized to radially contract wedge plates 106 and 108 to: non-rotatably connect inner race 104 and wedge plates 106 and 108; and enable inner race 104 and wedge plates 106 and 108 to rotate with respect to outer race 102 in directions CD1 and CD2.

Figure 15:
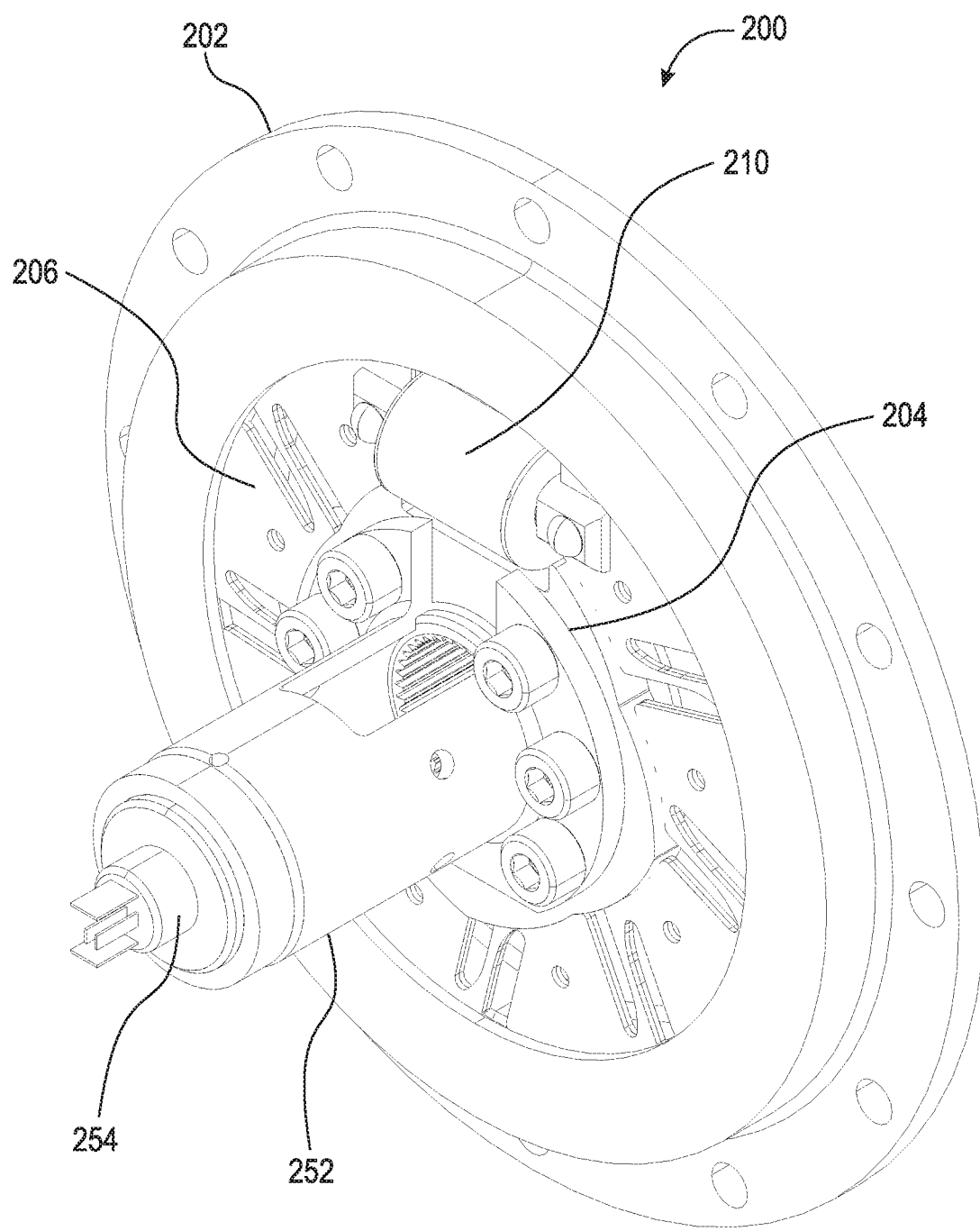
FIG. 15 is a front perspective view of an electromagnetic selectable wedge clutch.

FIG. 15 is a front perspective view of electromagnetic selectable wedge clutch 200.

Figure 16:
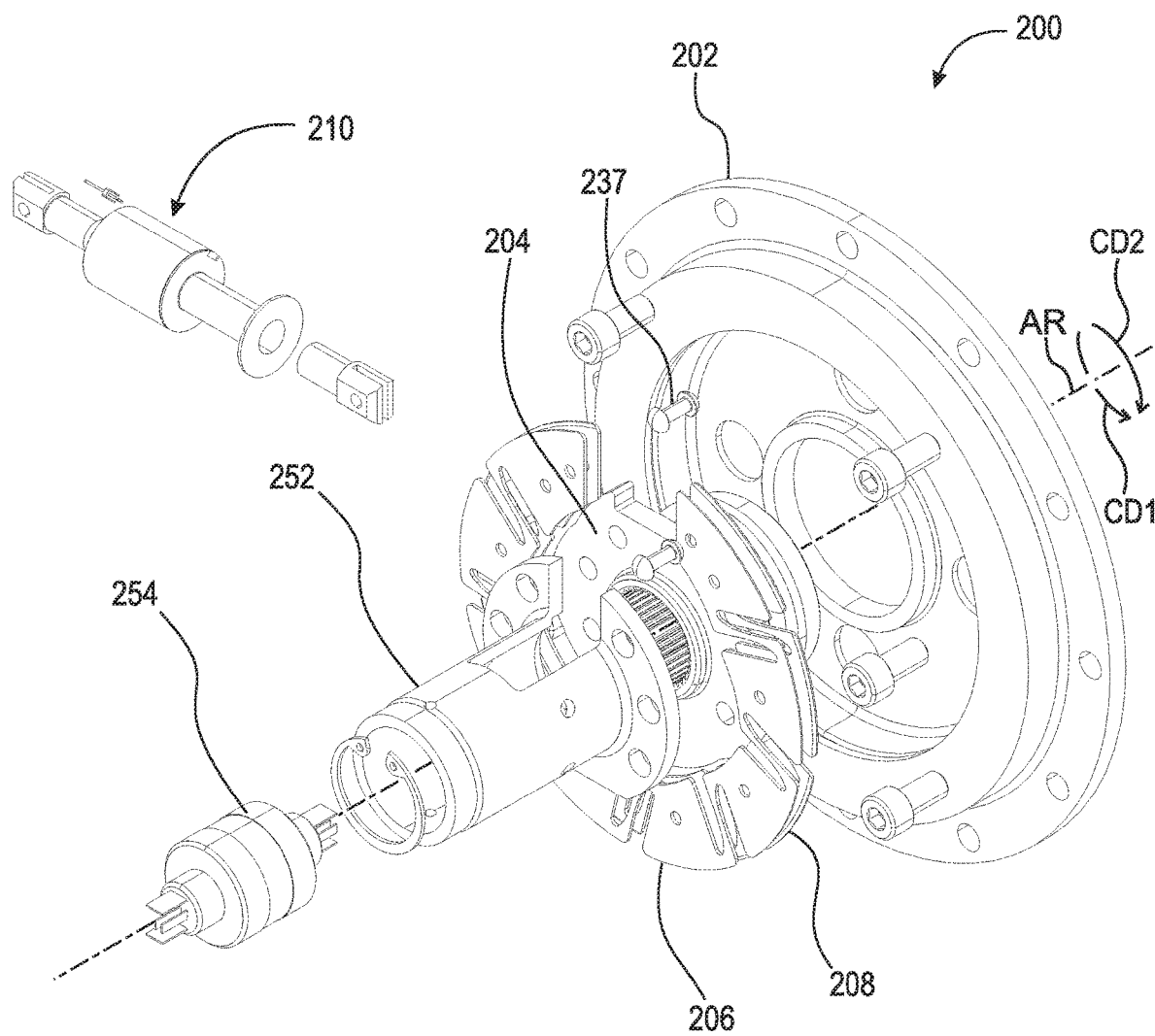
FIG. 16 is an exploded view of the electromagnetic selectable wedge clutch of FIG. 15.

FIG. 16 is an exploded view of electromagnetic selectable wedge clutch 200 of FIG. 15.

Figure 17:
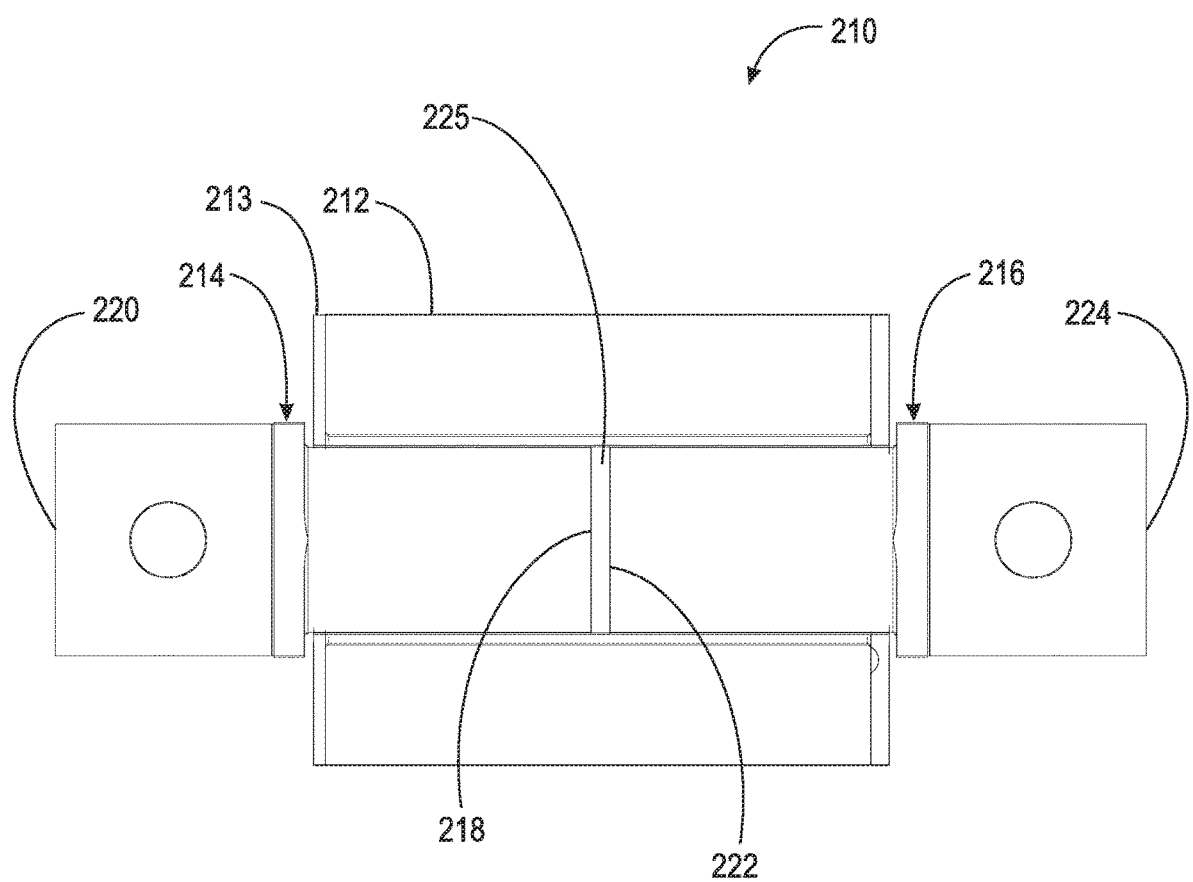
FIG. 17 is a cross-sectional view of an electromagnetic actuator of the electromagnetic selectable wedge clutch of FIG. 15.

FIG. 17 is a cross-sectional view of an electromagnetic actuator of electromagnetic selectable wedge clutch 200 of FIG. 1. The following should be viewed in light of FIGS. 15 through 17. Wedge clutch 200 includes: axis of rotation AR; outer race 202; inner race 204; wedge plates 206 and 208; and electromagnetic actuator 210. Wedge plates 206 and 208 are radially disposed between inner race 204 and outer race 202. In the example of FIG. 15, inner race 204 is arranged to receive rotational torque.

Figure 18:
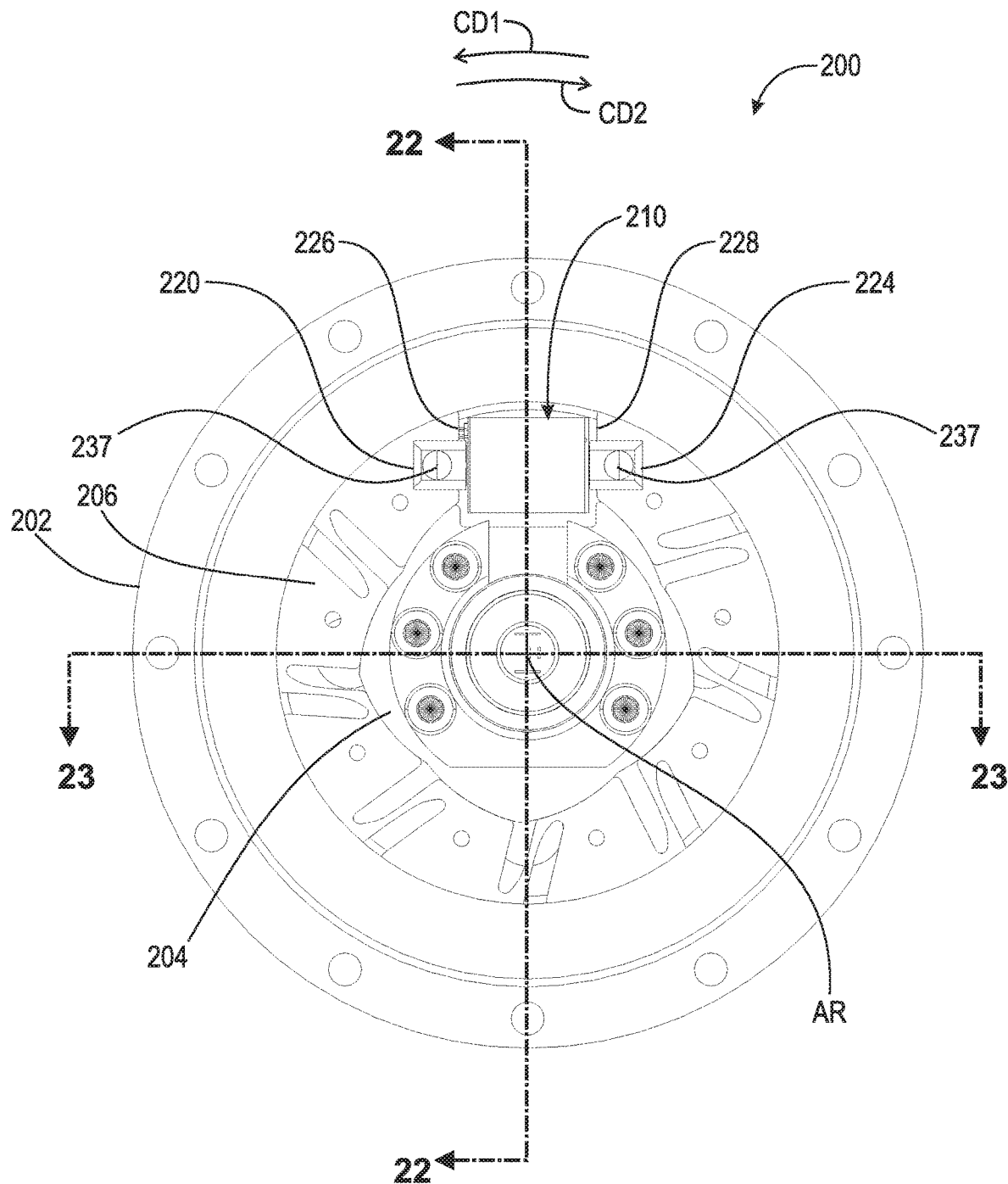
FIG. 18 is a front view of the electromagnetic selectable wedge clutch of FIG. 1.

FIG. 18 is a front view of electromagnetic selectable wedge clutch 200 of FIG. 15.

Figure 19:
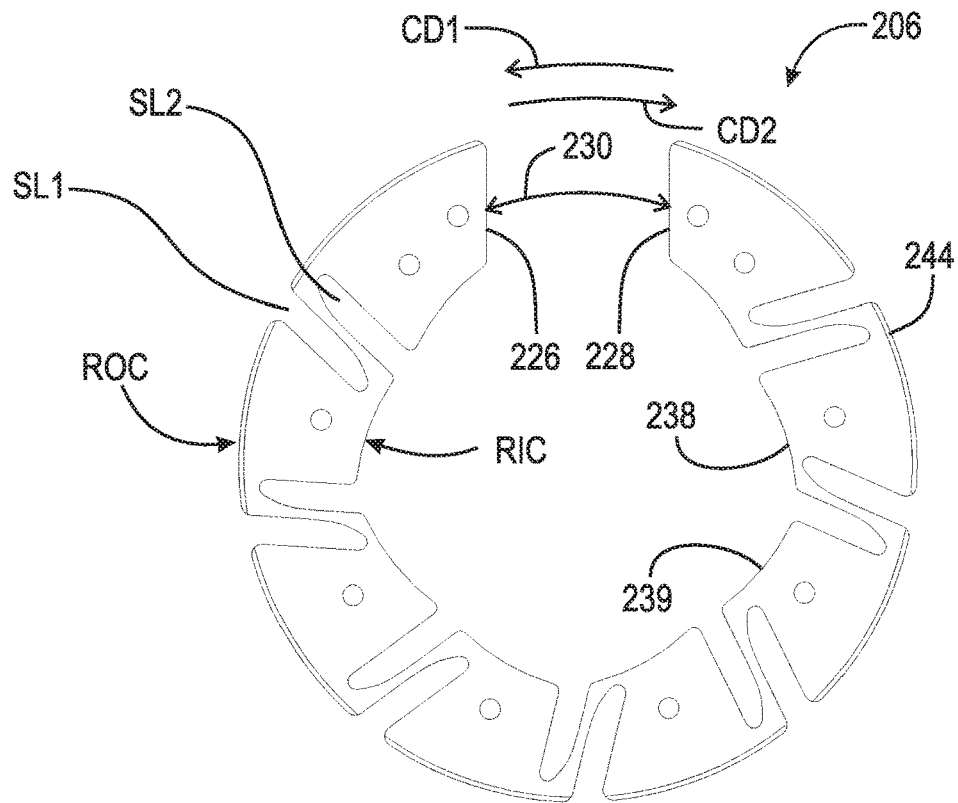
FIG. 19 is a front view of a wedge plate of the electromagnetic selectable wedge clutch of FIG. 1.

FIG. 19 is a front view of wedge plate 206 of electromagnetic selectable wedge clutch 200 of FIG. 15.

Figure 20:
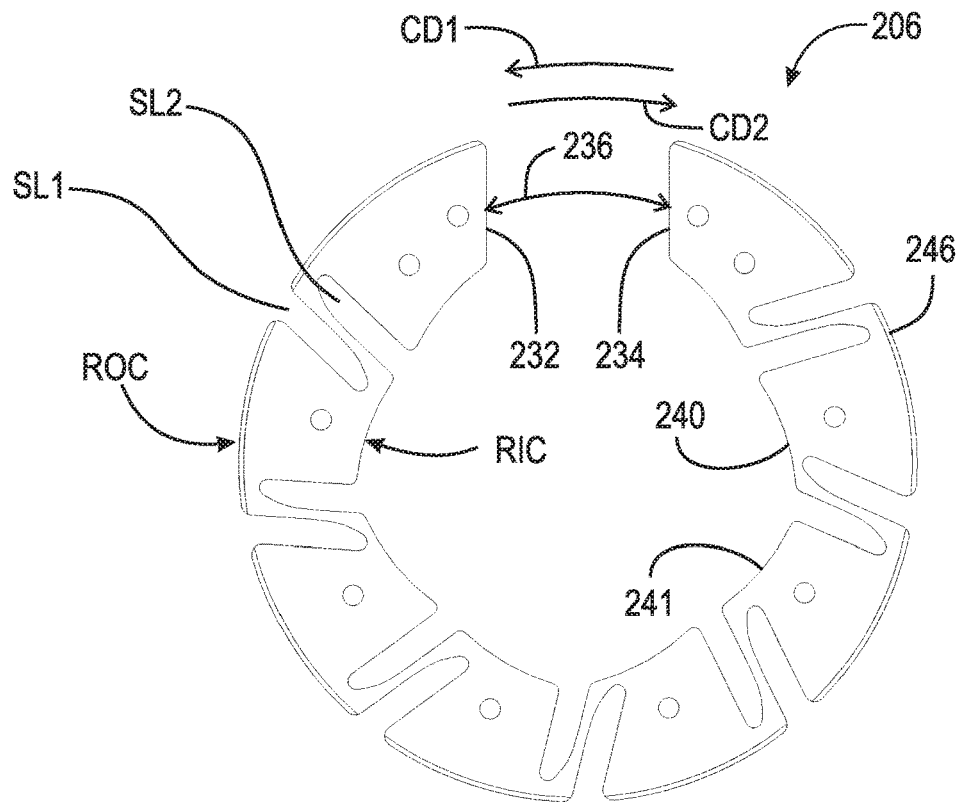
FIG. 20 is a front view of a wedge plate of the electromagnetic selectable wedge clutch of FIG. 15.

FIG. 20 is a front view of wedge plate 208 of electromagnetic selectable wedge clutch 200 of FIG. 15. The following should be viewed in light of FIGS. 15 through 20. In an example embodiment, wedge plates 206 and 208 includes slots SL1 extending radially inwardly from radially outer circumference ROC and slots SL2 extending radially outwardly from radially inner circumference RIC. In the example of FIG. 15, electromagnetic actuator 210 includes coil 212; bobbin 213; coil core piece 214; and coil core piece 216. Coil core piece 214 includes: end 218 disposed within coil 212; and end 220 connected to wedge plates 206 and 208. Coil core piece 216 includes: end 222 disposed within coil 212; and end 224 connected to wedge plates 206 and 208. To accommodate the radial contraction of wedge plates 206 and 208 described below, ends 218 and 222 are separated by air gap 225.

In a locked mode of wedge clutch 200, inner race 204, wedge plates 206 and 208, and outer race 202 are non-rotatably connected for rotation of inner race 204 in circumferential direction CD1 or in circumferential direction CD2. In a free-wheel mode of wedge clutch 200, inner race 204 is rotatable, with respect to outer race 202 in circumferential direction CD1 or in circumferential direction CD2.

To transition from the locked mode to the free-wheel mode, electromagnetic actuator 210 is arranged to be energized to: draw ends 218 and 222 toward each other; and radially contract wedge plates 206 and 208. To transition from the free-wheel mode to the locked mode: electromagnetic actuator 210 is arranged to be de-energized; and wedge plates 206 and 208 are arranged to expand radially outwardly to initiate or increase frictional contact between wedge plates 206 and 208 and outer race 202. For example, wedge plates 206 and 208 are preloaded with a radially outwardly expanding force that is overcome by electromagnetic actuator 210 to transition to the free-wheel mode, and which results in the radial expansion characterizing the transition to the locked mode.

Wedge plate 206 includes: circumferential end 226; and circumferential end 228. Wedge plate 206 is discontinuous between end 226 and end 228. For example, ends 226 and 228 are separated by gap 230 in circumferential direction CD1. End 220 of coil core piece 214 is fixedly connected to circumferential end 226. End 224 of coil core piece 216 is fixedly connected to circumferential end 228.

FIG. 20 is a front view of wedge plate 208 of electromagnetic selectable wedge clutch 200 of FIG. 15. The following should be viewed in light of FIGS. 15 through 20. Wedge plate 208 includes: circumferential end 232; and circumferential end 234. Wedge plate 208 is discontinuous between end 232 and end 234. For example, ends 232 and 234 are separated by gap 236 in circumferential direction CD1. End 220 of coil core piece 214 is fixedly connected to circumferential end 232. End 224 of coil core piece 216 is fixedly connected to circumferential end 234. In an example embodiment end 220 of coil core piece 214 is fixedly connected to circumferential ends 226 and 232 with bolt 237 and end 224 of coil core piece 216 is fixedly connected to circumferential ends 228 and 234 with bolt 237. However, it should be understood that any means known in the art can be used to fixedly connect coil core pieces 214 and 216 to wedge plates 206 and 208.

To transition from the locked mode to the free-wheel mode, electromagnetic actuator 210 is arranged to be energized to: bring circumferential end 226 and circumferential end 228 toward each in circumferential direction CD1 or circumferential direction CD2; and bring circumferential end 232 and circumferential end 234 toward each in circumferential direction CD1 or circumferential direction CD2. Stated otherwise, electromagnetic actuator 210 is arranged to be energized to decrease gaps 230 and 236.

Figure 21:
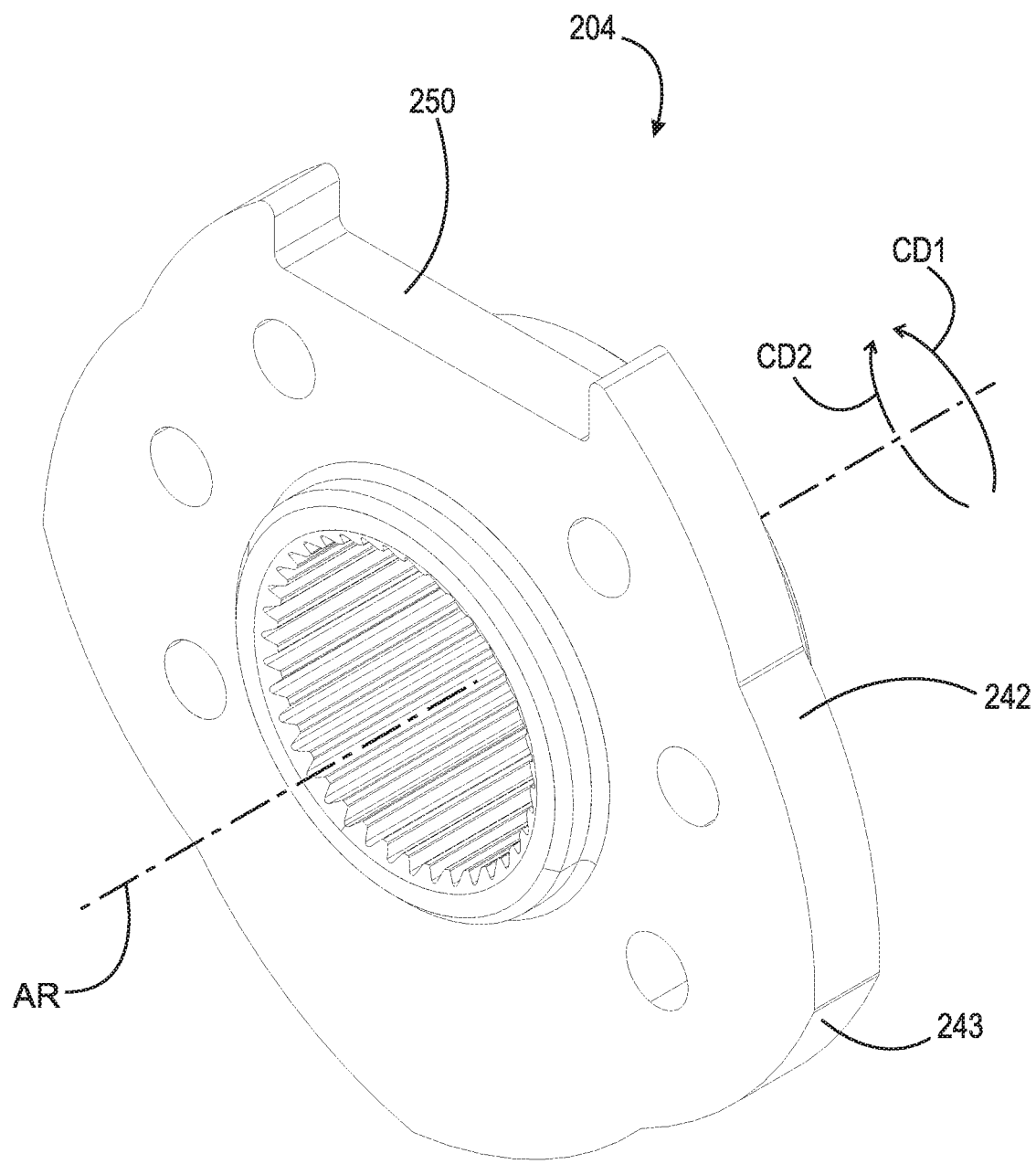
FIG. 21 is a front view of the inner race of the electromagnetic selectable wedge clutch of FIG. 15.

FIG. 21 is a front view of inner race 204 of electromagnetic selectable wedge clutch 200 of FIG. 15. The following should be viewed in light of FIGS. 15 through 21. Wedge plate 206 includes ramps 238 and 239. Wedge plate 208 includes ramps 240 and 241. Inner race 204 includes ramps 242 and 243. Each ramp 238 is in contact with a respective ramp 242. Each ramp 239 is in contact with a respective ramp 243. Each ramp 240 is in contact with a respective ramp 242. Each ramps 241 is in contact with a respective ramp 243. Ramps 238, 240, and 242 slope radially inwardly in circumferential direction CD1. Ramps 239, 241, and 243 slope radially inwardly in circumferential direction CD2.

Figure 22:
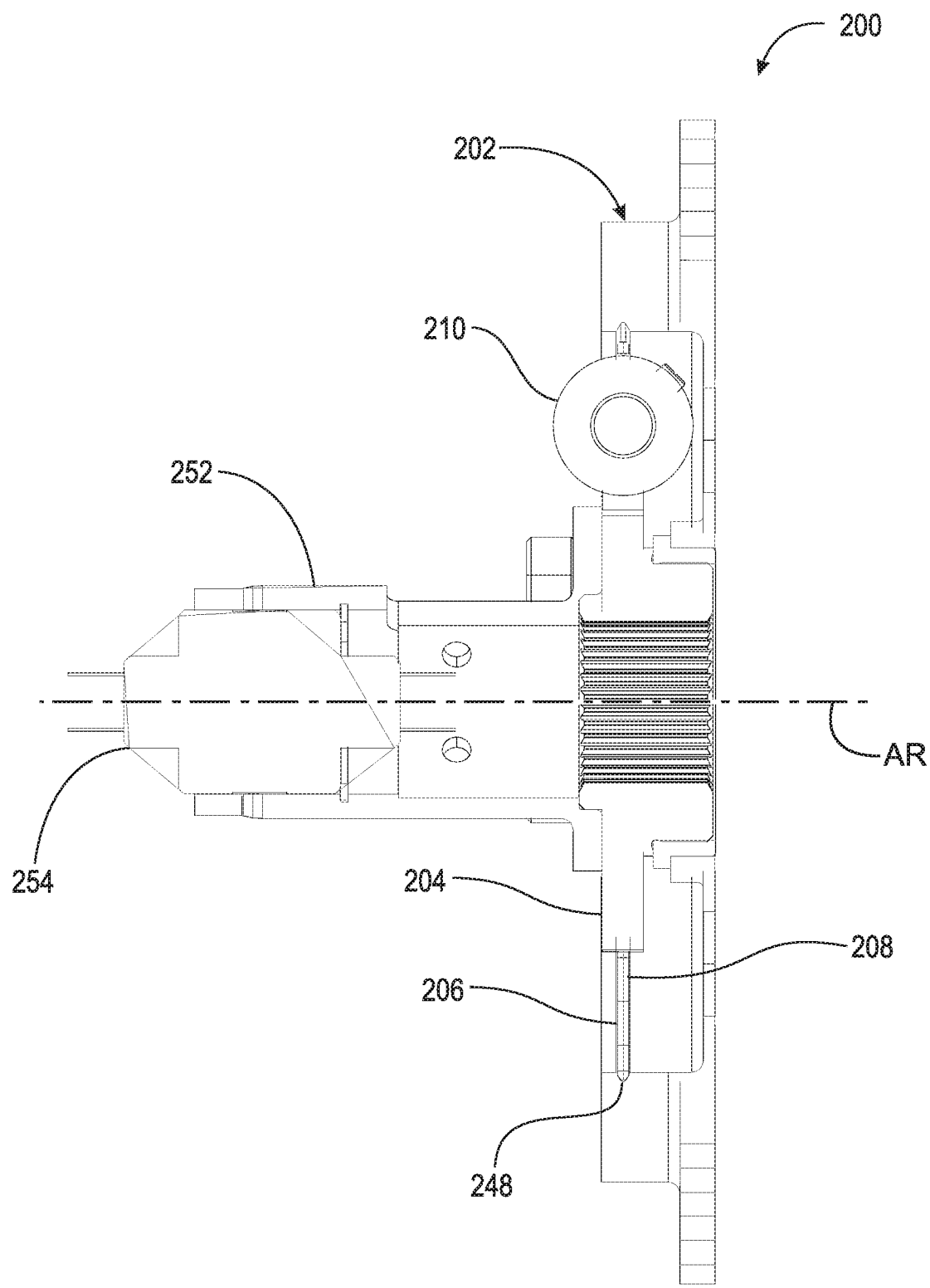
FIG. 22 is a cross-sectional view generally along line 22-22 in FIG. 18.

FIG. 22 is a cross-sectional view generally along line 22-22 in FIG. 18.

Figure 23:
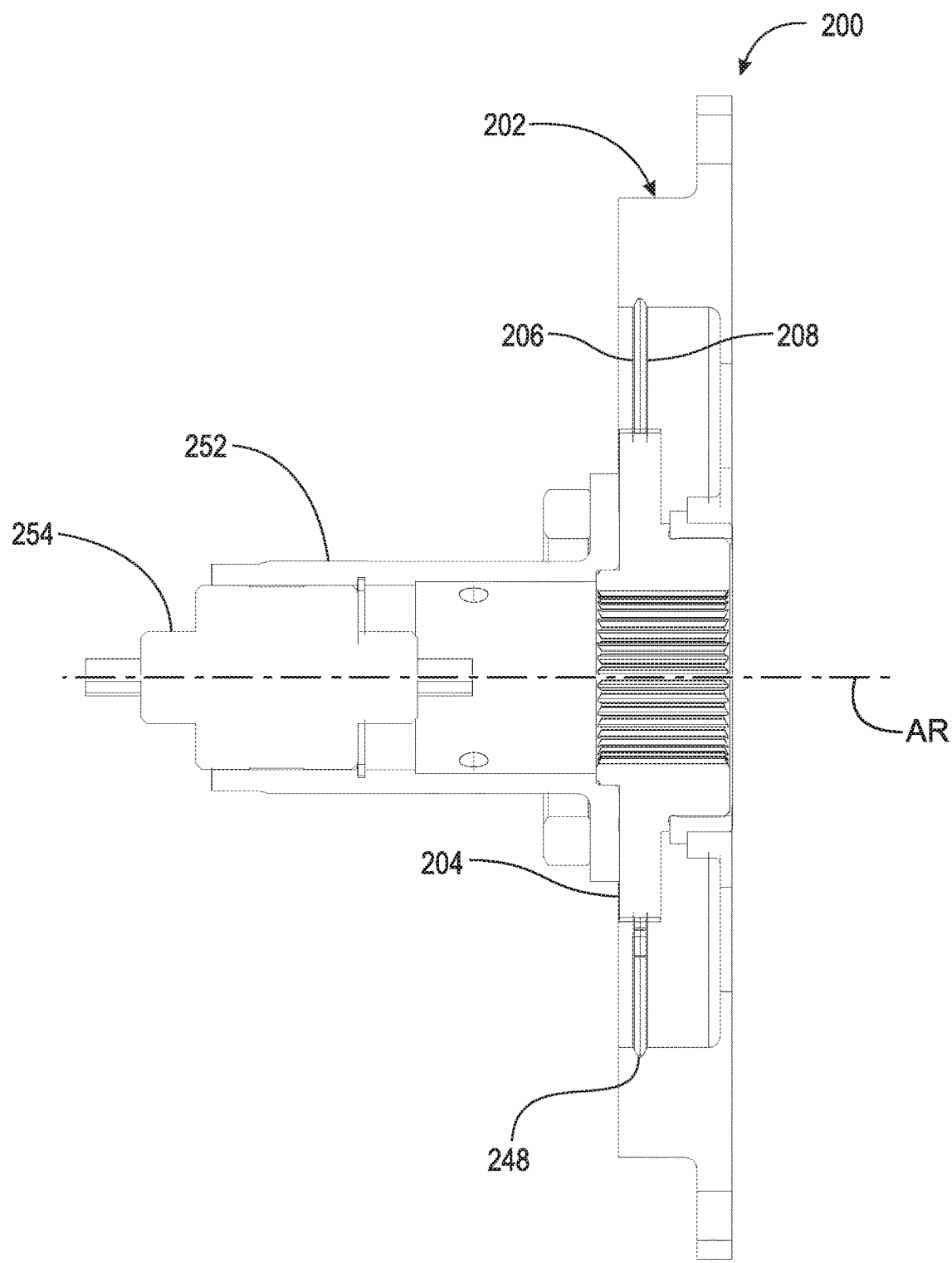
FIG. 23 is a cross-sectional view generally along line 23-23 in FIG. 18.

FIG. 23 is a cross-sectional view generally along line 23-23 in FIG. 18. The following should be viewed in light of FIGS. 15 through 23. In an example embodiment: wedge plate 206 includes chamfer 244; wedge plate 208 includes chamfer 246; and inner race 204 includes groove 248. Chamfers 244 and 246 are disposed at least partly in groove 248. In an example embodiment: inner race 204 includes slot 250, in which actuator 210 is located. Electrical power is supplied to actuator 210 by any means known in the art. In an example embodiment, clutch 200 includes slip ring retainer 252 and slip ring 254 for supplying electrical power to actuator 210.

The following provides further detail regarding operation of clutch 200. Clutch 200 is a controllable, bi-directional clutch. In the example of FIG. 15, clutch 200 has two operating modes: locked; and free-wheel. For the free-wheel mode, actuator 210 is energized to radially contract wedge plates 206 and 208 to: non-rotatably connect inner race 204 with wedge plates 206 and 208; disengage wedge plates 206 and 208 from outer race 202, and enable rotation of inner race 204 and wedge plates 206 and 208, with respect to outer race 202, in directions CD1 and CD2.

For the locked mode, actuator 210 is de-energized and wedge plate 206 and wedge plate 208 expand radially outwardly to: increase or initiate frictional contact between wedge plates 206 and 208 and outer race 202; and enable rotation of inner race 204 with respect to wedge plates 206 and 208 and outer race 202. Rotation of inner race 204 in direction CD1 in combination with the frictional contact causes ramps 242 to slide radially inwardly along ramps 238 and 240 to non-rotatably connect inner race 204, wedge plates 206 and 208, and outer race 202. Rotation of inner race 204 in direction CD2 in combination with the frictional contact causes ramps 243 to slide radially inwardly along ramps 239 and 241 to non-rotatably connecting inner race 204, wedge plates 206 and 208, and outer race 202.

When actuators 110, 150, and 210 are energized, magnetic flux density is highest within coil 112, coil 152, and coil 212, respectively. Magnetic flux in respective wedge plates during energization of actuators 110, 150, and 210 is much less dense than in the respective actuator coils and is concentrated at the circumferential ends of the respective wedge plates. The following discussion is directed to actuator 110 and wedge plates 106 and 108; however, it should be understood that the discussion is applicable to: actuator 150 and wedge plates 146 and 148; and actuator 210 and wedge plates 206 and 208. For example, when actuator 110 is energized, magnet flux in wedge plates 106 and 108 is much less than in coil 112 and is concentrated at circumferential ends 126, 128, 132, and 134. For example, when actuator 110 is energized magnetic field lines do not pass from circumferential ends 126 and 132 through wedge plates 106 and 108, respectively, to circumferential ends 128 and 134, respectively. Thus, when actuator 110 is de-energized, there is minimal residual magnetism in wedge plates 106 and 108 to negatively impact operations of clutch 100. For example, there is insufficient residual magnetism in wedge plates 106 and 108 to prevent the intended radial and circumferential expansion of wedge plates 106 and 108 when actuator 110 is de-energized.

It should be understood that combinations of all or parts of clutches 100 and 200 are possible. For example: inner race 144, wedge plates 146 and 148, and actuator 150 can be removed from clutch 100 so that clutch 100 is a controllable one-way clutch with a free-wheel mode for rotation of inner race 104 in direction CD2; or actuator 150 can be removed from clutch 100 so that inner race 104 has a controllable locked mode for rotation of inner race 104 in direction CD1 and a controllable free-wheel mode for rotation of inner race 104 in direction CD2 in conjunction with a non-controllable one-way function for inner race 144. That is, race 144 is rotatable with respect to outer race 102 for rotation of race 144 in direction CD1 and is non-rotatably connected to outer race 102 for rotation of race 144 in direction CD2.

It should be understood that clutches 100 and 200 are not limited to the example embodiments shown and described. For example: ramps 138, 140, and 142 can be configured to slope radially inwardly in direction CD2; and ramps 178, 180, and 182 can be configured to slope radially inwardly in direction CD1. For example, ramps 238, 240, and 242 can be configured to slope radially inwardly in direction CD2. For example, different numbers of ramps for wedge plates and inner races are possible.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
RD1 radial direction
RD2 radial direction
RIC radially inner circumference, wedge plate
ROC radially inner circumference, wedge plate
SL1 slot, wedge plate
SL2 slot, wedge plate
100 wedge clutch
102 outer race
104 inner race
106 wedge plate
108 wedge plate
110 electromagnetic actuator
112 coil
113 bobbin
114 coil core piece
116 coil core piece
118 end, coil core piece
120 end, coil core piece
122 end, coil core piece
124 end, coil core piece
125 air gap
126 circumferential end, wedge plate
128 circumferential end, wedge plate
130 gap
132 circumferential end, wedge plate
134 circumferential end, wedge plate
136 gap, wedge plate
137 bolt
138 ramp, wedge plate
140 ramp, wedge plate
142 ramp, inner race
144 inner race
145 bolt
146 wedge plate
148 wedge plate
150 electromagnetic actuator
152 coil
153 bobbin
154 coil core piece
156 coil core piece
158 end, coil core piece
160 end, coil core piece
162 end, coil core piece
164 end, coil core piece
165 air gap
166 circumferential end, wedge plate
168 circumferential end, wedge plate
169 bolt
170 gap, wedge plate
172 circumferential end, wedge plate
174 circumferential end, wedge plate
176 gap, wedge plate
178 ramp, wedge plate
180 ramp, wedge plate
182 ramp, inner race
184 chamfer
186 chamfer
188 groove
190 chamfer
192 chamfer
194 groove
196 slot
197 slot
198 slip ring retainer
199 slip ring
200 wedge clutch
202 outer race
204 inner race
206 wedge plate
208 wedge plate
210 electromagnetic actuator
212 coil
213 bobbin
214 coil core piece
216 coil core piece
218 end, coil core piece
220 end, coil core piece
222 end, coil core piece
224 end, coil core piece
225 air gap
226 circumferential end, wedge plate 228 circumferential end, wedge plate
230 gap, wedge plate
232 circumferential end, wedge plate
234 circumferential end, wedge plate
236 gap, wedge plate
237 bolt
238 ramp, wedge plate
239 ramp, wedge plate
240 ramp, wedge plate
241 ramp, wedge plate
242 ramp, inner race
243 ramp, inner race
244 chamfer
246 chamfer
248 groove
250 slot
252 slip ring retainer
254 slip ring

The invention claimed is:

1. A wedge clutch, comprising:
an axis of rotation;
an outer race;
a first inner race;
a first wedge plate radially disposed between the first inner race and the outer race; and,
a first electromagnetic actuator including:
a first coil;
a first coil core piece including:
a first end disposed within the first coil; and,
a second end connected to the first wedge plate; and,
a second coil core piece including:
a first end disposed within the first coil; and,
a second end connected to the first wedge plate, wherein:
in a first locked mode of the wedge clutch, the first inner race, the first wedge plate, and the outer race are non-rotatably connected for rotation of the first inner race in a first circumferential direction;
in a first free-wheel mode of the wedge clutch, the first inner race is rotatable, with respect to the outer race, in the first circumferential direction; and,
to transition from the first locked mode to the first free-wheel mode, the first electromagnetic actuator is arranged to be energized to radially contract the first wedge plate.

2. The wedge clutch of claim 1, wherein to transition from the first free-wheel mode to the first locked mode:
the first electromagnetic actuator is arranged to be de-energized; and,
the first wedge plate is arranged to expand radially outwardly to initiate or increase frictional contact between the first wedge plate and the outer race.

3. The wedge clutch of claim 1, wherein:
the first wedge plate includes:
a first circumferential end; and,
a second circumferential end;
the first wedge plate is discontinuous between the first circumferential end and the second circumferential end;
the second end of the first coil core piece is fixedly connected to the first circumferential end; and,
the second end of the second coil core piece is fixedly connected to the second circumferential end.

4. The wedge clutch of claim 3, wherein to transition from the first locked mode to the first free-wheel mode, the first electromagnetic actuator is arranged to be energized to bring the first circumferential end and the second circumferential end toward each other in a circumferential direction.

5. The wedge clutch of claim 1, wherein:
the first wedge plate includes a plurality of first ramps;
the first inner race includes a plurality of second ramps; and,
each first ramp is in contact with a respective second ramp.

6. The wedge clutch of claim 5, wherein:
said each first ramp slopes radially inwardly in the first circumferential direction;
the respective second ramp slopes radially inwardly in the first circumferential direction; and,
to transition from the first locked mode to the first free-wheel mode, the first electromagnetic actuator is arranged to slide at least one first ramp radially inwardly along at least one second ramp in the first circumferential direction.

7. The wedge clutch of claim 1, wherein:
in a second free-wheel mode of the wedge clutch, one of the first inner race or the outer race is rotatable with respect to the other of the first inner race or the outer race for relative rotation of the first inner race, with respect to the outer race, in a second circumferential direction, opposite the first circumferential direction; and,
to transition from the first locked mode to the second free-wheel mode, the first electromagnetic actuator is arranged to be energized to radially contract the first wedge plate.

8. The wedge clutch of claim 1, wherein:
in a second locked mode of the wedge clutch, the first inner race, the first wedge plate, and the outer race are non-rotatably connected for rotation of the first inner race in a second circumferential direction, opposite the first circumferential direction;
in a second free-wheel mode of the wedge clutch, the first inner race is rotatable, with respect to the outer race, in the second circumferential direction;
to transition from the second locked mode to the second free-wheel mode, the first electromagnetic actuator is arranged to be energized to radially contract the first wedge plate; and,
to transition from the second free-wheel mode to the second locked mode:
the first electromagnetic actuator is arranged to be de-energized; and,
the first wedge plate is arranged to expand radially outwardly to initiate or increase frictional contact between the first wedge plate and the outer race.

9. The wedge clutch of claim 8, wherein:
the first wedge plate includes a plurality of first ramps and a plurality of second ramps;
the first inner race includes a plurality of first ramps and a plurality of second ramps;
each first ramp of the first wedge plate is in contact with a respective first ramp of the first inner race; and,
each second ramp of the first wedge plate is in contact with a respect second ramp of the first inner race.

10. The wedge clutch of claim 9, wherein:
said each first ramp of the first wedge plate slopes radially inwardly in the first circumferential direction;
the respective first ramp of the first inner race slopes radially inwardly in the first circumferential direction;
said each second ramp of the first wedge plate slopes radially inwardly in the second circumferential direction; and, the respective second ramp of the first inner race slopes radially inwardly in the second circumferential direction.

11. The wedge clutch of claim 1, further comprising:
a second inner race non-rotatably connected to the first inner race;
a second wedge plate radially disposed between the second inner race and the outer race; and,
a second electromagnetic actuator including:
a second coil;
a third coil core piece including:
a first end disposed within the second coil; and,
a second end connected to the second wedge plate; and,
a fourth coil core piece including:
a first end disposed within the second coil; and,
a second end connected to the second wedge plate, wherein:
in a second locked mode of the wedge clutch, the second inner race, the second wedge plate, and the outer race are non-rotatably connected for rotation of the second inner race in a second circumferential direction, opposite the first circumferential direction;
in a second free-wheel mode of the wedge clutch, the second inner race is rotatable, with respect to the outer race, in the second circumferential direction; and,
to transition from the second locked mode to the second free-wheel mode, the second electromagnetic actuator is arranged to be energized to radially contract the second wedge plate.

12. The wedge clutch of claim 11, wherein to transition from the second free-wheel mode to the second locked mode:
the second electromagnetic actuator is arranged to be de-energized; and,
the second wedge plate is arranged to expand radially outwardly to initiate or increase frictional contact between the second wedge plate and the outer race.

13. The wedge clutch of claim 11, wherein:
the second wedge plate includes:
a first circumferential end; and,
a second circumferential end;
the second wedge plate is discontinuous between the first circumferential end and the second circumferential end;
the second end of the third coil core piece is fixedly connected to the first circumferential end; and,
the second end of the fourth coil core piece is fixedly connected to the second circumferential end.

14. The wedge clutch of claim 11, wherein:
the first wedge plate includes a plurality of ramps sloping radially inwardly in the first circumferential direction;
the first inner race includes a plurality of ramps, each ramp of the first inner race:
sloping radially inwardly in the first circumferential direction; and,
in contact with a respective ramp of the first wedge plate;
the second wedge plate includes a plurality of ramps sloping radially inwardly in the second circumferential direction; and,
the second inner race includes a plurality of ramps, each ramp of the second inner race:
sloping radially inwardly in the second circumferential direction; and,
in contact with a respective ramp of the second wedge plate.

15. A wedge clutch, comprising:
an outer race;
a first inner race;
a first wedge plate:
radially disposed between the first inner race and the outer race;
including:
a first circumferential end; and,
a second circumferential end; and,
discontinuous between the first circumferential end and the second circumferential end; and,
a first electromagnetic actuator including:
a coil;
a first coil core piece including:
a first end disposed within the coil; and,
a second end fixedly connected to the first circumferential end of the first wedge plate; and,
a second coil core piece including:
a first end disposed within the coil; and,
a second end fixedly connected to the second circumferential end of the first wedge plate, wherein:
in a first locked mode of the wedge clutch, the first inner race, the first wedge plate, and the outer race are non-rotatably connected for rotation of the first inner race in a first circumferential direction;
in a first free-wheel mode of the wedge clutch, the first inner race is rotatable, with respect to the outer race, in the first circumferential direction; and,
to transition from the first locked mode to the first free-wheel mode, the first electromagnetic actuator is arranged to be energized to:
displace the first end of the first coil core piece and the first end of the second coil core piece toward each other; and,
radially contract the first wedge plate.

16. The wedge clutch of claim 15, further comprising:
a second inner race non-rotatably connected to the first inner race;
a second wedge plate radially disposed between the second inner race and the outer race and including a first circumferential end and a second circumferential end; and,
a second electromagnetic actuator including:
a coil;
a first coil core piece including:
a first end disposed within the coil of the second electromagnetic actuator; and,
a second end fixedly connected to the first circumferential end of the second wedge plate; and,
a second coil core piece including:
a first end disposed within the coil of the second electromagnetic actuator; and,
a second end fixedly connected to the second circumferential end of the second wedge plate, wherein:
in a second locked mode of the wedge clutch, the second inner race, the second wedge plate, and the outer race are non-rotatably connected for rotation of the second inner race in a second circumferential direction, opposite the first circumferential direction;
in a second free-wheel mode of the wedge clutch, the second inner race is rotatable, with respect to the outer race, in the second circumferential direction; and,
to transition from the second locked mode to the second free-wheel mode, the second electromagnetic actuator is arranged to be energized to radially contract the second wedge plate.

17. The wedge clutch of claim 16, wherein:
the first wedge plate includes a plurality of ramps;
each ramp slopes radially inwardly in the first circumferential direction;
the first inner race includes a plurality of ramps;
each ramp of the first inner race:
- slopes radially inwardly in the first circumferential direction; and,
- is in contact with a respective ramp of the first wedge plate;

the second wedge plate includes a plurality of ramps;
each ramp of the second wedge plate slopes radially inwardly in the second circumferential direction;
the second inner race includes a plurality of ramps;
each ramp of the second inner race:
- slopes radially inwardly in the second circumferential direction; and,
- is in contact with a respective ramp of the second wedge plate.

18. A wedge clutch, comprising:
an outer race;
an inner race;
a wedge plate radially disposed between the inner race and the outer race; and,
an electromagnetic actuator including:
- a coil;
- a first coil core piece including:
  - a first end disposed within the coil; and,
  - a second end fixedly connected to the wedge plate; and,
- a second coil core piece including:
  - a third end disposed within the coil; and,
  - a fourth end fixedly connected to the wedge plate, wherein:

in a locked mode of the wedge clutch, the inner race, the wedge plate, and the outer race are non-rotatably connected;
in a free-wheel mode of the wedge clutch, the inner race is rotatable with respect to the outer race; and,
to transition from the locked mode to the free-wheel mode, the electromagnetic actuator is arranged to be energized to:
- bring the first end and the third end toward each other in a first circumferential direction; and,
- radially contract the wedge plate.

19. The wedge clutch of claim 18, wherein to transition from the free-wheel mode to the locked mode:
the electromagnetic actuator is arranged to be de-energized; and,
the wedge plate is arranged to expand radially outwardly.

20. The wedge clutch of claim 18, wherein:
the wedge plate includes:
- a plurality of first ramps sloping radially inwardly in the first circumferential direction; and,
- a plurality of second ramps sloping radially inwardly in a second circumferential direction, opposite the first circumferential direction;

the inner race includes:
- a plurality of first ramps sloping radially inwardly in the first circumferential direction; and,
- a plurality of second ramps sloping radially inwardly in the second circumferential direction;

each first ramp of the wedge plate is in contact with a respect first ramp of the inner race; and,
each second ramp of the wedge plate is in contact with a respective second ramp of the inner race.

* * * * *